US012681252B2

(12) United States Patent　　(10) Patent No.:　US 12,681,252 B2
Schurmans et al.　　(45) Date of Patent: 　Jul. 14, 2026

(54) DEVICE AND METHOD FOR SEALING CABLES IN TELECOMMUNICATIONS ENCLOSURES OF DIFFERENT TYPES WITH THE SAME DEVICE

(71) Applicant: COMMSCOPE CONNECTIVITY BELGIUM BV, Kessel-Lo (BE)

(72) Inventors: Eric Schurmans, Genk (BE); Antonio Fernández, Leuven (BE); Roger Joseph Alaerts, Ramsel (BE); Karel Vanwinkel, Tielt-Winge (BE)

(73) Assignee: Commscope Connectivity Belgium BV, Kessel-Lo (BE)

( * ) Notice: Subject to any disclaimer, the term of this patent is extended or adjusted under 35 U.S.C. 154(b) by 206 days.

(21) Appl. No.: 17/919,219

(22) PCT Filed: Apr. 14, 2021

(86) PCT No.: PCT/EP2021/059642
§ 371 (c)(1),
(2) Date: Oct. 14, 2022

(87) PCT Pub. No.: WO2021/209492
PCT Pub. Date: Oct. 21, 2021

(65) Prior Publication Data
US 2023/0161127 A1　May 25, 2023

Related U.S. Application Data

(60) Provisional application No. 63/010,332, filed on Apr. 15, 2020.

(51) Int. Cl.
*G02B 6/44*　　(2006.01)
(52) U.S. Cl.
CPC ................................. *G02B 6/4444* (2013.01)

(58) Field of Classification Search
CPC . F21V 3/02; F21V 3/049; F21V 5/002; F21V 23/0464; F21V 23/006;
(Continued)

(56) References Cited

U.S. PATENT DOCUMENTS 4,041,306 A * 8/1977 Compton .................. F21V 7/09
362/297
4,146,297 A * 3/1979 Alferness .............. G02F 1/3132
385/27
(Continued)

FOREIGN PATENT DOCUMENTS

EP　　3 396 798 A1　10/2018
WO　2012/168292 A2　12/2012
WO　2014/005918 A2　1/2014

OTHER PUBLICATIONS

International Search Report and Written Opinion of the International Searching Authority for International Patent Application No. PCT/EP2021/059642 mailed Aug. 10, 2021, 21 pages.
(Continued)

*Primary Examiner* — Andrew Jordan
(74) *Attorney, Agent, or Firm* — Merchant & Gould P.C.

(57)　　　　ABSTRACT

A device for sealing a telecommunications cable is disclosed. The device includes a first part, and a second part having one or more attachment members that assemble onto the first part to assemble the first and second parts together. A cavity is defined between the first and second parts that extends along a central axis and between first and second ends of the device. The cavity is structured to seal the cable between the first and second parts without threading the cable through the first and second ends, and the first and second parts define at least one mounting location for a cable port in a telecommunications enclosure. The cavity may receive a resin to seal the cable between the first and second parts.

14 Claims, 20 Drawing Sheets

(58) Field of Classification Search
CPC .......... F21V 15/01; F21S 8/043; F21S 8/086;
F21W 2131/10; F21W 2131/103; F21W
2131/105; F21Y 2105/10; F21Y 2115/10;
F21Y 2103/10; G02B 6/4444; G02B
6/44775; H02G 15/013
See application file for complete search history.

(56) References Cited

U.S. PATENT DOCUMENTS

| | | | | |
|---|---|---|---|---|
| 4,371,916 A | * | 2/1983 | De Martino | F21S 43/26 362/337 |
| 4,441,787 A | * | 4/1984 | Lichtenberger | G02B 6/449 57/7 |
| 4,714,983 A | * | 12/1987 | Lang | G02F 1/133615 362/613 |
| 4,842,364 A | | 6/1989 | Chen | |
| 4,914,553 A | * | 4/1990 | Hamada | G02B 6/0048 362/311.06 |
| 4,954,930 A | * | 9/1990 | Maegawa | G02B 6/0033 362/85 |
| 4,977,486 A | * | 12/1990 | Gotoh | G01D 11/28 362/613 |
| 5,005,108 A | * | 4/1991 | Pristash | G02B 6/0061 362/23.15 |
| 5,009,483 A | * | 4/1991 | Rockwell, III | G02B 6/0065 385/116 |
| 5,026,161 A | * | 6/1991 | Werner | G02B 6/283 356/460 |
| 5,040,098 A | * | 8/1991 | Tanaka | G09F 13/0409 362/23.15 |
| 5,047,761 A | * | 9/1991 | Sell | B60Q 3/14 340/815.45 |
| 5,061,404 A | * | 10/1991 | Wu | C07D 277/82 252/582 |
| 5,081,564 A | * | 1/1992 | Mizoguchi | F21S 43/26 362/268 |
| 5,097,258 A | * | 3/1992 | Iwaki | G08B 5/36 362/292 |
| 5,103,383 A | * | 4/1992 | Mayhew | G08B 5/006 362/186 |
| 5,113,177 A | * | 5/1992 | Cohen | G02B 27/0172 348/E13.041 |
| 5,113,472 A | * | 5/1992 | Gualtieri | G02B 6/02 385/141 |
| 5,171,080 A | * | 12/1992 | Bathurst | H01H 19/025 362/23.17 |
| 5,175,787 A | * | 12/1992 | Gualtieri | G02B 6/122 385/141 |
| 5,186,865 A | * | 2/1993 | Wu | C07D 277/82 548/146 |
| 5,245,689 A | * | 9/1993 | Gualtieri | G02B 6/122 385/142 |
| 5,253,317 A | * | 10/1993 | Allen | G02B 6/4436 174/110 SR |
| 5,274,729 A | * | 12/1993 | King | G02B 6/3891 385/59 |
| 5,295,019 A | * | 3/1994 | Rapoport | G02B 27/1006 359/638 |
| 5,309,544 A | * | 5/1994 | Saxe | G02B 6/0096 385/901 |
| 5,359,687 A | * | 10/1994 | McFarland | G02B 6/138 430/326 |
| 5,359,691 A | * | 10/1994 | Tai | G02F 1/13362 362/561 |
| 5,396,350 A | * | 3/1995 | Beeson | G02B 6/0053 359/251 |
| 5,398,179 A | * | 3/1995 | Pacheco | F21V 19/00 362/364 |
| 5,400,224 A | * | 3/1995 | DuNah | G02B 6/0043 362/616 |
| 5,416,684 A | * | 5/1995 | Pearce | F21V 5/00 362/310 |
| 5,428,468 A | * | 6/1995 | Zimmerman | F21V 5/02 362/619 |
| 5,461,547 A | * | 10/1995 | Ciupke | G02B 6/0038 362/330 |
| 5,462,700 A | * | 10/1995 | Beeson | G03B 21/625 264/2.6 |
| 5,481,385 A | * | 1/1996 | Zimmerman | G02F 1/133524 349/62 |
| 5,506,924 A | * | 4/1996 | Inoue | G02B 5/045 385/129 |
| 5,521,725 A | * | 5/1996 | Beeson | G02B 6/0053 362/625 |
| 5,521,726 A | * | 5/1996 | Zimmerman | G02B 5/3025 349/96 |
| 5,528,720 A | * | 6/1996 | Winston | G02F 1/133615 385/129 |
| 5,537,304 A | * | 7/1996 | Klaus | F21V 29/15 362/147 |
| 5,541,039 A | * | 7/1996 | McFarland | G02F 1/065 430/13 |
| 5,548,670 A | * | 8/1996 | Koike | G02B 5/0236 385/27 |
| 5,553,092 A | * | 9/1996 | Bruce | H01S 3/093 372/72 |
| 5,555,109 A | * | 9/1996 | Zimmerman | G02B 6/0053 349/63 |
| 5,555,160 A | * | 9/1996 | Tawara | G02B 6/0046 362/330 |
| 5,555,329 A | * | 9/1996 | Kuper | G02B 6/0028 385/36 |
| 5,572,411 A | * | 11/1996 | Watai | G02B 5/0231 362/23.18 |
| 5,577,492 A | * | 11/1996 | Parkyn, Jr. | G02B 6/4206 126/700 |
| 5,580,156 A | * | 12/1996 | Suzuki | F21V 7/09 116/63 P |
| 5,584,556 A | * | 12/1996 | Yokoyama | G02B 6/0038 362/330 |
| 5,598,280 A | * | 1/1997 | Nishio | F21V 5/04 362/627 |
| 5,598,281 A | * | 1/1997 | Zimmerman | G02F 1/133606 349/5 |
| 5,613,751 A | * | 3/1997 | Parker | G02B 6/0068 362/297 |
| 5,613,770 A | * | 3/1997 | Chin, Jr. | F21V 1/06 248/220.1 |
| 5,657,408 A | * | 8/1997 | Ferm | G02B 6/1228 264/1.27 |
| 5,658,066 A | * | 8/1997 | Hirsch | F21V 21/005 362/225 |
| 5,659,410 A | * | 8/1997 | Koike | G02B 6/0046 362/621 |
| 5,676,453 A | * | 10/1997 | Parkyn, Jr. | G02B 6/003 362/291 |
| 5,676,457 A | * | 10/1997 | Simon | F21V 7/00 362/268 |
| 5,677,702 A | * | 10/1997 | Inoue | G09F 11/29 345/32 |
| 5,685,634 A | * | 11/1997 | Mulligan | G09F 27/008 362/345 |
| 5,696,865 A | * | 12/1997 | Beeson | G02B 6/03611 385/124 |
| 5,702,176 A | * | 12/1997 | Engle | F21V 15/015 362/225 |
| 5,718,497 A | * | 2/1998 | Yokoyama | G02B 6/0036 362/330 |
| 5,719,619 A | * | 2/1998 | Hattori | H04M 11/00 434/323 |
| 5,719,649 A | * | 2/1998 | Shono | G02B 6/0036 362/617 |
| 5,727,107 A | * | 3/1998 | Umemoto | G02B 6/0038 385/116 |
| 5,735,590 A | * | 4/1998 | Kashima | G02B 6/0038 362/23.15 |
| 5,739,931 A | * | 4/1998 | Zimmerman | F21V 5/02 359/834 |

(56)          References Cited

U.S. PATENT DOCUMENTS

| | | | | | |
|---|---|---|---|---|---|
| 5,748,828 A | * | 5/1998 | Steiner | G02F 1/133621 | 359/291 |
| 5,761,355 A | * | 6/1998 | Kuper | G02B 6/0053 | 385/36 |
| 5,769,522 A | * | 6/1998 | Kaneko | G02B 6/0051 | 362/337 |
| 5,771,039 A | * | 6/1998 | Ditzik | G02B 6/08 | 257/E27.111 |
| 5,777,857 A | * | 7/1998 | Degelmann | F21S 2/00 | 362/225 |
| 5,806,955 A | * | 9/1998 | Parkyn, Jr. | F21V 7/0091 | 362/800 |
| 5,812,714 A | * | 9/1998 | Hulse | G02B 6/4298 | 385/39 |
| 5,818,555 A | * | 10/1998 | Yokoyama | G02B 6/0043 | 349/67 |
| 5,839,823 A | * | 11/1998 | Hou | F21V 5/005 | 362/333 |
| 5,850,498 A | * | 12/1998 | Shacklette | G02B 6/1221 | 385/129 |
| 5,854,872 A | * | 12/1998 | Tai | G02B 6/4298 | 362/302 |
| 5,857,767 A | * | 1/1999 | Hochstein | F21V 29/763 | 362/547 |
| 5,863,113 A | * | 1/1999 | Oe | G02B 6/0061 | 362/237 |
| 5,872,883 A | * | 2/1999 | Ohba | G02B 6/125 | 430/33 |
| 5,895,114 A | * | 4/1999 | Thornton | F21V 19/007 | 362/306 |
| 5,897,201 A | * | 4/1999 | Simon | G02B 6/0068 | 362/147 |
| 5,914,759 A | * | 6/1999 | Higuchi | G02B 6/0053 | 349/64 |
| 5,914,760 A | * | 6/1999 | Daiku | G02B 6/0053 | 349/95 |
| 5,949,933 A | * | 9/1999 | Steiner | G02B 6/0053 | 385/36 |
| 5,961,198 A | * | 10/1999 | Hira | G02B 6/0036 | 362/621 |
| 5,967,637 A | * | 10/1999 | Ishikawa | G02B 6/0046 | 264/5 |
| 5,974,214 A | * | 10/1999 | Shacklette | G02B 6/13 | 385/98 |
| 5,997,148 A | * | 12/1999 | Ohkawa | G02B 6/0038 | 385/901 |
| 5,999,281 A | * | 12/1999 | Abbott | G03B 21/62 | 156/166 |
| 5,999,685 A | * | 12/1999 | Goto | G02B 6/0038 | 362/617 |
| 6,002,829 A | * | 12/1999 | Winston | G02B 6/0056 | 385/129 |
| 6,007,209 A | * | 12/1999 | Pelka | G02F 1/133603 | 362/97.3 |
| 6,043,951 A | * | 3/2000 | Lee | G11B 5/5534 | |
| 6,044,196 A | * | 3/2000 | Winston | G02B 6/0038 | 359/833 |
| 6,050,707 A | * | 4/2000 | Kondo | F21V 7/04 | 362/346 |
| 6,079,838 A | * | 6/2000 | Parker | G02B 6/0018 | 362/23.15 |
| 6,097,549 A | * | 8/2000 | Jenkins | F21S 43/14 | 362/520 |
| 6,134,092 A | * | 10/2000 | Pelka | G02B 6/0023 | 361/800 |
| 6,139,176 A | * | 10/2000 | Hulse | G02B 6/0005 | 362/277 |
| 6,155,692 A | * | 12/2000 | Ohkawa | G02B 6/0038 | 359/628 |
| 6,155,693 A | * | 12/2000 | Spiegel | F21V 21/00 | 362/217.08 |
| 6,161,939 A | * | 12/2000 | Bansbach | F21S 8/061 | 362/346 |
| 6,164,790 A | * | 12/2000 | Lee | G02B 6/0061 | 362/330 |
| 6,164,791 A | * | 12/2000 | Gwo-Juh | G02B 6/0061 | 362/330 |
| 6,167,182 A | * | 12/2000 | Shinohara | G02B 6/0046 | 385/129 |
| 6,185,357 B1 | * | 2/2001 | Zou | G02B 6/0096 | 362/339 |
| 6,206,535 B1 | * | 3/2001 | Hattori | G02B 6/0046 | 362/616 |
| 6,231,200 B1 | * | 5/2001 | Shinohara | G02B 6/0046 | 362/330 |
| 6,232,592 B1 | * | 5/2001 | Sugiyama | G02B 6/0038 | 358/475 |
| 6,241,363 B1 | * | 6/2001 | Lee | F21V 9/40 | 362/333 |
| 6,241,367 B1 | * | 6/2001 | Wedell | F21V 17/20 | 362/346 |
| 6,250,774 B1 | * | 6/2001 | Begemann | F21S 8/086 | 362/240 |
| 6,257,737 B1 | * | 7/2001 | Marshall | F21V 7/30 | 362/231 |
| 6,259,854 B1 | * | 7/2001 | Shinji | G02B 6/00 | 362/625 |
| 6,264,347 B1 | * | 7/2001 | Godbillon | F21S 43/26 | 362/521 |
| 6,296,376 B1 | * | 10/2001 | Kondo | F21V 5/02 | 362/310 |
| 6,304,693 B1 | * | 10/2001 | Buelow | G02B 6/4298 | 362/346 |
| 6,310,704 B1 | * | 10/2001 | Dogan | H04B 7/086 | 398/9 |
| 6,318,886 B1 | * | 11/2001 | Stopa | F21S 45/47 | 362/555 |
| 6,367,984 B1 | * | 4/2002 | Stephenson | G02B 6/3825 | 385/76 |
| 6,379,016 B1 | * | 4/2002 | Boyd | G02B 6/0038 | 362/348 |
| 6,379,017 B2 | * | 4/2002 | Nakabayashi | G02B 6/0031 | 362/23.15 |
| 6,400,086 B1 | * | 6/2002 | Huter | F21V 13/04 | 315/56 |
| 6,421,103 B2 | * | 7/2002 | Yamaguchi | G02F 1/133602 | 349/64 |
| 6,443,594 B1 | * | 9/2002 | Marshall | G02B 3/0037 | 362/244 |
| 6,452,217 B1 | * | 9/2002 | Wojnarowski | F21V 29/87 | 362/555 |
| 6,461,007 B2 | * | 10/2002 | Akaoka | G02B 6/0038 | 362/610 |
| 6,473,554 B1 | * | 10/2002 | Pelka | G02B 6/0061 | 385/901 |
| 6,480,307 B1 | * | 11/2002 | Yang | G02B 5/045 | 362/23.15 |
| 6,481,130 B1 | * | 11/2002 | Wu | G02B 6/003 | 40/563 |
| 6,485,157 B2 | * | 11/2002 | Ohkawa | G02B 6/0036 | 362/333 |
| 6,508,563 B2 | * | 1/2003 | Parker | B60Q 1/0082 | 362/85 |
| 6,510,265 B1 | * | 1/2003 | Giaretta | G02B 6/32 | 385/38 |
| 6,523,986 B1 | * | 2/2003 | Hoffmann | E04F 19/02 | 362/374 |
| 6,536,921 B1 | * | 3/2003 | Simon | F21V 13/04 | 362/268 |
| 6,541,720 B2 | * | 4/2003 | Gerald | F21V 27/00 | 439/211 |
| 6,547,416 B2 | * | 4/2003 | Pashley | F21S 10/02 | 362/296.05 |
| 6,554,451 B1 | * | 4/2003 | Keuper | F21V 5/02 | 362/244 |
| 6,554,541 B1 | * | 4/2003 | Antonsen | B63B 21/27 | 405/224.1 |

(56)          References Cited

U.S. PATENT DOCUMENTS

| 6,568,819 | B1 * | 5/2003 | Yamazaki | G02B 6/0038 |
| | | | | 362/330 |
| 6,582,103 | B1 * | 6/2003 | Popovich | F21V 7/24 |
| | | | | 361/240 |
| 6,585,356 | B1 * | 7/2003 | Ohkawa | G02B 6/0038 |
| | | | | 347/65 |
| 6,598,998 | B2 * | 7/2003 | West | G02B 19/0028 |
| | | | | 362/310 |
| 6,612,723 | B2 * | 9/2003 | Futhey | F21V 5/02 |
| | | | | 362/558 |
| 6,616,290 | B2 * | 9/2003 | Ohkawa | G02B 6/0061 |
| | | | | 362/619 |
| 6,629,764 | B1 * | 10/2003 | Uehara | G02B 6/0061 |
| | | | | 362/330 |
| 6,633,722 | B1 * | 10/2003 | Kohara | G02B 6/0061 |
| | | | | 385/146 |
| 6,634,772 | B2 * | 10/2003 | Yaphe | F21V 21/005 |
| | | | | 362/225 |
| 6,641,284 | B2 * | 11/2003 | Stopa | F21V 17/164 |
| | | | | 362/240 |
| 6,644,841 | B2 * | 11/2003 | Martineau | F21V 7/09 |
| | | | | 362/241 |
| 6,648,490 | B2 * | 11/2003 | Klose | F21S 8/024 |
| | | | | 362/372 |
| 6,784,357 | B1 * | 8/2004 | Wang | F21S 8/086 |
| | | | | 362/159 |
| 6,853,151 | B2 * | 2/2005 | Leong | H05B 45/3578 |
| | | | | 362/240 |
| 6,871,983 | B2 * | 3/2005 | Jacob | F21V 27/00 |
| | | | | 362/147 |
| 6,880,952 | B2 * | 4/2005 | Kiraly | F21V 29/74 |
| | | | | 362/373 |
| 6,908,219 | B1 * | 6/2005 | Reiss | B60Q 1/302 |
| | | | | 362/338 |
| 6,942,361 | B1 * | 9/2005 | Kishimura | F21V 19/0025 |
| | | | | 362/240 |
| 6,971,781 | B2 * | 12/2005 | Guy | F21V 7/0008 |
| | | | | 362/559 |
| 7,008,097 | B1 * | 3/2006 | Hulse | F21K 9/00 |
| | | | | 362/546 |
| 7,011,428 | B1 * | 3/2006 | Hand | F21V 15/01 |
| | | | | 362/217.05 |
| 7,021,799 | B2 * | 4/2006 | Mizuyoshi | F21V 29/67 |
| | | | | 257/E33.072 |
| 7,021,805 | B2 * | 4/2006 | Amano | F21V 7/0091 |
| | | | | 362/307 |
| 7,025,482 | B2 * | 4/2006 | Yamashita | B60K 35/40 |
| | | | | 362/348 |
| 7,067,992 | B2 * | 6/2006 | Leong | F21K 9/27 |
| | | | | 315/DIG. 4 |
| 7,090,370 | B2 * | 8/2006 | Clark | F21S 9/037 |
| | | | | 362/183 |
| 7,114,832 | B2 * | 10/2006 | Holder | F21S 41/255 |
| | | | | 362/329 |
| 7,144,135 | B2 * | 12/2006 | Martin | F21S 6/003 |
| | | | | 362/345 |
| 7,150,553 | B2 * | 12/2006 | English | F21S 43/195 |
| | | | | 362/547 |
| 7,172,319 | B2 * | 2/2007 | Holder | F21K 9/233 |
| | | | | 257/E33.071 |
| 7,196,459 | B2 * | 3/2007 | Morris | H05K 1/0274 |
| | | | | 313/46 |
| 7,213,940 | B1 * | 5/2007 | Van De Ven | H05B 45/20 |
| | | | | 257/89 |
| 7,217,009 | B2 * | 5/2007 | Klose | F21V 13/10 |
| | | | | 362/297 |
| 7,244,058 | B2 * | 7/2007 | DiPenti | F21V 29/505 |
| | | | | 362/547 |
| 7,275,841 | B2 * | 10/2007 | Kelly | F21K 9/233 |
| | | | | 362/296.07 |
| 7,278,761 | B2 * | 10/2007 | Kuan | F21S 8/086 |
| | | | | 362/373 |
| 7,321,115 | B2 * | 1/2008 | Langlois | H05B 47/11 |
| | | | | 250/214.1 |
| 7,329,030 | B1 * | 2/2008 | Wang | F21V 29/83 |
| | | | | 362/311.06 |
| 7,347,706 | B1 * | 3/2008 | Wu | H01R 13/7175 |
| | | | | 430/642 |
| 7,407,307 | B2 * | 8/2008 | Hiratsuka | F21V 17/164 |
| | | | | 362/241 |
| 7,420,811 | B2 * | 9/2008 | Chan | F21V 29/763 |
| | | | | 362/345 |
| 7,422,357 | B1 * | 9/2008 | Chang | G02B 6/0028 |
| | | | | 362/628 |
| 7,434,959 | B1 * | 10/2008 | Wang | F21S 8/086 |
| | | | | 362/218 |
| 7,438,447 | B2 * | 10/2008 | Holder | F21V 7/04 |
| | | | | 362/296.07 |
| 7,488,093 | B1 * | 2/2009 | Huang | F21S 8/086 |
| | | | | 362/373 |
| 7,520,641 | B2 * | 4/2009 | Minano | F21V 7/0091 |
| | | | | 362/346 |
| 7,534,013 | B1 * | 5/2009 | Simon | F21V 5/046 |
| | | | | 362/244 |
| 7,547,126 | B2 * | 6/2009 | Hiratsuka | F21V 7/0025 |
| | | | | 362/241 |
| 7,566,159 | B2 * | 7/2009 | Oon | H01L 33/62 |
| | | | | 257/676 |
| 7,593,229 | B2 * | 9/2009 | Shuy | F21V 29/86 |
| | | | | 361/701 |
| 7,593,615 | B2 * | 9/2009 | Chakmakjian | G02B 6/0038 |
| | | | | 362/346 |
| 7,628,508 | B2 * | 12/2009 | Kita | F21V 9/08 |
| | | | | 362/240 |
| 7,635,205 | B2 * | 12/2009 | Yu | F21V 29/83 |
| | | | | 362/373 |
| 7,637,633 | B2 * | 12/2009 | Wong | F21V 29/83 |
| | | | | 362/547 |
| 7,639,918 | B2 * | 12/2009 | Sayers | G02B 6/001 |
| | | | | 362/621 |
| 7,641,363 | B1 * | 1/2010 | Chang | F21V 29/713 |
| | | | | 362/345 |
| 7,648,257 | B2 * | 1/2010 | Villard | F21V 29/70 |
| | | | | 362/249.02 |
| 7,658,510 | B2 * | 2/2010 | Russell | F21V 29/506 |
| | | | | 362/249.02 |
| 7,667,477 | B2 * | 2/2010 | Nagata | G01R 29/26 |
| | | | | 257/E21.531 |
| 7,726,840 | B2 * | 6/2010 | Pearson | F21S 2/005 |
| | | | | 362/249.02 |
| 7,736,019 | B2 * | 6/2010 | Shimada | F21V 13/02 |
| | | | | 362/249.14 |
| 7,766,508 | B2 * | 8/2010 | Villard | F21S 4/20 |
| | | | | 362/249.02 |
| 7,794,127 | B2 * | 9/2010 | Huang | H01L 33/54 |
| | | | | 257/E33.001 |
| 7,800,125 | B2 * | 9/2010 | Chen | G02B 19/0061 |
| | | | | 362/257 |
| 7,802,902 | B2 * | 9/2010 | Moss | H05B 45/10 |
| | | | | 362/249.02 |
| 7,810,960 | B1 * | 10/2010 | Soderman | F21S 8/04 |
| | | | | 362/249.02 |
| 7,813,131 | B2 * | 10/2010 | Liang | F21V 23/02 |
| | | | | 174/547 |
| 7,857,619 | B2 * | 12/2010 | Liu | G02B 3/08 |
| | | | | 433/29 |
| 7,938,562 | B2 * | 5/2011 | Ivey | F21V 23/0435 |
| | | | | 362/276 |
| 7,959,330 | B2 * | 6/2011 | Hashimoto | F21V 29/83 |
| | | | | 362/373 |
| 7,963,664 | B2 * | 6/2011 | Bertram | G02B 19/0066 |
| | | | | 362/346 |
| 7,967,477 | B2 * | 6/2011 | Bloemen | G02B 19/0066 |
| | | | | 362/255 |
| D641,923 | S * | 7/2011 | Radchenko | D26/138 |
| 7,980,723 | B2 * | 7/2011 | Kosters | F21S 8/04 |
| | | | | 362/225 |

(56)                References Cited

U.S. PATENT DOCUMENTS

| | | | | |
|---|---|---|---|---|
| 8,002,426 | B2 * | 8/2011 | Pearson | F21V 33/006 362/217.1 |
| 8,061,870 | B2 * | 11/2011 | Pearson | F21S 8/033 362/249.02 |
| 8,061,875 | B2 * | 11/2011 | Zhang | F21V 29/70 362/218 |
| 8,068,288 | B1 * | 11/2011 | Pitou | F21V 5/04 359/743 |
| 8,070,306 | B2 * | 12/2011 | Ruud | F21V 21/30 362/249.02 |
| 8,100,556 | B2 * | 1/2012 | Patrick | F21V 14/02 362/249.02 |
| 8,113,687 | B2 * | 2/2012 | Villard | F21V 15/01 362/249.02 |
| 8,123,382 | B2 * | 2/2012 | Patrick | F21V 29/74 362/249.02 |
| 8,186,855 | B2 * | 5/2012 | Wassel | F21K 9/90 362/249.02 |
| 8,206,009 | B2 * | 6/2012 | Tickner | F21V 29/73 362/373 |
| 8,215,787 | B2 * | 7/2012 | Mathai | E04B 9/241 362/330 |
| 8,232,745 | B2 * | 7/2012 | Chemel | H05B 47/19 315/307 |
| 8,253,154 | B2 * | 8/2012 | Jung | G02B 19/0061 257/E33.068 |
| 8,272,756 | B1 * | 9/2012 | Patrick | F21S 8/04 362/249.02 |
| 8,277,106 | B2 * | 10/2012 | Van Gorkom | G02B 6/0028 362/616 |
| 8,287,152 | B2 * | 10/2012 | Gill | F21V 29/75 362/249.02 |
| 8,288,951 | B2 * | 10/2012 | Storch | H10K 50/00 315/297 |
| 8,317,366 | B2 * | 11/2012 | Dalton | F21V 5/002 362/614 |
| 8,322,881 | B1 * | 12/2012 | Wassel | F21S 8/026 362/217.05 |
| 8,324,817 | B2 * | 12/2012 | Ivey | H05B 47/10 315/153 |
| 8,330,342 | B2 * | 12/2012 | Bhairi | G02B 19/0061 362/329 |
| 8,348,489 | B2 * | 1/2013 | Holman | G02B 6/0083 349/111 |
| 8,353,606 | B2 * | 1/2013 | Jeong | F21V 19/001 362/240 |
| 8,366,296 | B2 * | 2/2013 | Newman | F21V 29/507 362/249.02 |
| 8,382,387 | B1 * | 2/2013 | Sandoval | G03B 29/00 362/253 |
| 8,398,276 | B2 * | 3/2013 | Pearson | F21V 21/025 362/248 |
| 8,408,737 | B2 * | 4/2013 | Wright | G09F 13/22 362/237 |
| 8,408,739 | B2 * | 4/2013 | Villard | F21V 19/02 362/249.02 |
| 8,414,304 | B2 * | 4/2013 | Mathai | H10K 59/80 257/E21.026 |
| 8,419,224 | B2 * | 4/2013 | Wan-Chih | F21V 29/74 362/249.02 |
| 8,425,071 | B2 * | 4/2013 | Ruud | F21V 29/83 362/249.02 |
| 8,434,892 | B2 * | 5/2013 | Zwak | G02B 6/0018 362/249.02 |
| 8,434,893 | B2 * | 5/2013 | Boyer | F21V 7/18 362/240 |
| 8,469,567 | B2 * | 6/2013 | Futami | F21V 5/02 362/249.02 |
| 8,472,775 | B2 * | 6/2013 | Corbille | G02B 6/445 385/135 |
| 8,475,010 | B2 * | 7/2013 | Vissenberg | G02B 6/0011 362/326 |
| 8,485,684 | B2 * | 7/2013 | Lou | F21V 7/005 362/217.05 |
| 8,511,862 | B2 * | 8/2013 | Ishida | F21S 8/08 313/46 |
| 8,519,424 | B2 * | 8/2013 | Hammond | H10K 50/88 257/E33.056 |
| 8,529,100 | B1 * | 9/2013 | Patrick | F21V 29/763 362/431 |
| 8,547,022 | B2 * | 10/2013 | Summerford | H05B 41/16 315/250 |
| 8,547,983 | B2 * | 10/2013 | Diab | H04L 12/12 370/254 |
| 8,567,983 | B2 * | 10/2013 | Boyer | F21V 7/24 362/153.1 |
| 8,573,823 | B2 * | 11/2013 | Dau | F21V 7/0016 362/560 |
| 8,593,070 | B2 * | 11/2013 | Wang | H05B 45/39 363/125 |
| D695,447 | S * | 12/2013 | Speier | D26/118 |
| 8,646,944 | B2 * | 2/2014 | Villard | F21K 9/65 362/249.02 |
| 8,651,719 | B2 * | 2/2014 | Teng | G06F 3/042 362/559 |
| 8,657,463 | B2 * | 2/2014 | Lichten | A01K 31/18 362/217.05 |
| 8,696,169 | B2 * | 4/2014 | Tickner | F21V 15/01 362/249.02 |
| 8,696,173 | B2 * | 4/2014 | Urtiga | F21V 7/0091 362/276 |
| 8,702,281 | B2 * | 4/2014 | Okada | F21S 43/245 362/311.06 |
| 8,777,453 | B2 * | 7/2014 | Donegan | H05B 47/19 362/249.05 |
| 8,814,396 | B2 * | 8/2014 | Ishida | F21V 5/04 362/373 |
| 8,836,221 | B2 * | 9/2014 | Storch | H05B 47/10 315/297 |
| D726,947 | S * | 4/2015 | Boyer | D26/71 |
| D729,966 | S * | 5/2015 | Szalontai | D26/70 |
| D729,967 | S * | 5/2015 | Szalontai | D26/71 |
| D729,968 | S * | 5/2015 | Szalontai | D26/71 |
| 9,028,087 | B2 * | 5/2015 | Wilcox | F21V 19/04 362/249.02 |
| 9,028,096 | B2 * | 5/2015 | Verdes | F21V 29/507 362/373 |
| 9,039,223 | B2 * | 5/2015 | Rudd | F21V 29/507 362/249.02 |
| 9,039,253 | B2 * | 5/2015 | Jin | F21V 23/026 362/154 |
| 9,072,127 | B2 * | 6/2015 | Lu | F21V 23/003 |
| 9,086,217 | B2 * | 7/2015 | Eckert | F21V 29/83 |
| 9,099,592 | B2 * | 8/2015 | Derryberry | H01L 31/0543 |
| 9,182,096 | B2 * | 11/2015 | Kinnune | F21K 9/20 |
| 9,206,973 | B2 * | 12/2015 | Fussell | F21S 8/026 |
| 9,212,808 | B2 * | 12/2015 | Higley | F21V 15/01 |
| 9,239,150 | B2 * | 1/2016 | Sieberth | F21V 29/507 |
| 9,243,794 | B2 * | 1/2016 | Wilcox | F21V 5/04 |
| 9,261,270 | B2 * | 2/2016 | Ruud | F21V 29/70 |
| 9,353,927 | B2 * | 5/2016 | Ishida | F21V 29/76 |
| 9,366,396 | B2 * | 6/2016 | Yuan | F21V 29/773 |
| 9,366,799 | B2 * | 6/2016 | Wilcox | G02B 6/0045 |
| 9,389,367 | B2 * | 7/2016 | Yuan | G02B 6/0031 |
| 9,400,363 | B2 * | 7/2016 | Coenegracht | G02B 6/4446 |
| 9,423,085 | B2 * | 8/2016 | Zahn | F21K 9/64 |
| 9,448,353 | B2 * | 9/2016 | Holman | G02B 6/005 |
| 9,464,766 | B2 * | 10/2016 | Clauss | F21V 29/70 |
| 9,506,635 | B2 * | 11/2016 | Gattari | F21S 8/086 |
| 9,534,775 | B2 * | 1/2017 | Wilcox | F21V 15/013 |
| 9,541,246 | B2 * | 1/2017 | Ruud | F21S 8/086 |
| 9,562,655 | B2 * | 2/2017 | Villard | F21K 9/90 |
| 9,568,662 | B2 * | 2/2017 | Lim | G02B 6/262 |
| 9,574,735 | B2 * | 2/2017 | Benitez | G02B 27/0961 |
| 9,581,751 | B2 * | 2/2017 | Yuan | G02B 6/0031 |
| 9,593,827 | B2 * | 3/2017 | Ji | H05B 45/20 |
| 9,593,838 | B2 * | 3/2017 | Van Es | F21V 29/507 |
| 9,625,638 | B2 * | 4/2017 | Durkee | G02B 6/0028 |
| 9,632,214 | B2 * | 4/2017 | Streppel | G02B 3/0006 |

(56) References Cited

U.S. PATENT DOCUMENTS

| | | | | |
|---|---|---|---|---|
| 9,632,268 B2 * | 4/2017 | Coenegracht | | G02B 6/44775 |
| 9,632,295 B2 * | 4/2017 | Castillo | | F21V 5/04 |
| 9,642,201 B2 * | 5/2017 | Lu | | F21V 23/003 |
| 9,651,740 B2 * | 5/2017 | Tarsa | | G02B 6/26 |
| 9,699,854 B2 * | 7/2017 | Wassel | | F21V 7/005 |
| 9,709,242 B2 * | 7/2017 | Benitez | | F21V 23/0457 |
| 9,709,725 B2 * | 7/2017 | Wilcox | | G02B 6/0073 |
| 9,798,072 B2 * | 10/2017 | Wilcenski | | G02B 6/0033 |
| 9,835,317 B2 * | 12/2017 | Yuan | | G02B 6/0045 |
| 9,945,527 B2 * | 4/2018 | Jha | | F21S 41/141 |
| 9,952,372 B2 * | 4/2018 | Wilcox | | G02B 6/24 |
| 9,966,751 B2 * | 5/2018 | Thompson | | H01B 3/46 |
| 9,982,876 B2 * | 5/2018 | Li | | F21V 23/005 |
| 9,989,213 B2 * | 6/2018 | Sun | | F21V 7/24 |
| 10,018,343 B2 * | 7/2018 | Wasserman | | F21V 23/0435 |
| 10,042,106 B2 * | 8/2018 | Wilcox | | G02B 6/24 |
| 10,054,741 B2 * | 8/2018 | Smith | | G02B 6/4478 |
| 10,168,023 B1 * | 1/2019 | Hein | | F21S 8/086 |
| 10,174,893 B2 * | 1/2019 | Kim | | F21V 23/026 |
| 10,208,907 B2 * | 2/2019 | Wang | | F21S 8/085 |
| 10,209,429 B2 * | 2/2019 | van de Ven | | G02B 6/0021 |
| 10,223,946 B2 * | 3/2019 | Auyeung | | F21V 29/74 |
| 10,241,289 B2 * | 3/2019 | Claessens | | G02B 6/4444 |
| 10,268,010 B2 * | 4/2019 | Pasek | | H02G 3/083 |
| 10,277,024 B2 * | 4/2019 | Thompson | | H05K 5/0221 |
| 10,317,028 B2 * | 6/2019 | Bochenek | | F21V 15/01 |
| 10,317,060 B2 * | 6/2019 | Nimma | | F21V 23/0471 |
| 10,317,608 B2 * | 6/2019 | Lim | | G02B 6/0016 |
| 10,323,807 B2 * | 6/2019 | Sterkina | | F21V 5/007 |
| 10,337,693 B1 * | 7/2019 | Gordin | | H05B 47/20 |
| 10,339,841 B2 * | 7/2019 | Auyeung | | F21V 29/745 |
| 10,344,948 B1 * | 7/2019 | Gordin | | F21V 11/04 |
| 10,371,912 B2 * | 8/2019 | Coenegracht | | G02B 6/445 |
| 10,410,551 B2 * | 9/2019 | Auyeung | | G09F 13/02 |
| 10,416,377 B2 * | 9/2019 | Girotto | | F21V 23/0485 |
| 10,422,944 B2 * | 9/2019 | Yuan | | F21S 8/026 |
| 10,436,969 B2 * | 10/2019 | Yuan | | F21K 9/61 |
| 10,460,634 B2 * | 10/2019 | Auyeung | | F21S 6/006 |
| 10,527,785 B2 * | 1/2020 | Tarsa | | F21V 23/0435 |
| 10,612,753 B2 * | 4/2020 | Clynne | | H05B 47/19 |
| 10,656,356 B2 * | 5/2020 | Bryon | | G02B 6/4446 |
| D886,355 S * | 6/2020 | Chen | | D26/92 |
| 10,741,107 B2 * | 8/2020 | Hall | | H01B 11/02 |
| 10,811,862 B2 * | 10/2020 | Kempeneers | | H02G 15/046 |
| 10,816,179 B2 * | 10/2020 | Nimma | | F21V 5/007 |
| D906,578 S * | 12/2020 | Smith | | D26/92 |
| 10,890,714 B2 * | 1/2021 | Tarsa | | G02B 6/0045 |
| 10,891,881 B2 * | 1/2021 | Auyeung | | F21V 31/005 |
| 10,901,164 B2 * | 1/2021 | Claessens | | G02B 6/4477 |
| 10,920,959 B2 * | 2/2021 | Vasylyev | | G02F 1/133603 |
| 10,935,211 B2 * | 3/2021 | Castillo | | F21V 3/02 |
| 10,948,156 B2 * | 3/2021 | Thijssen | | F21K 9/27 |
| D926,703 S * | 8/2021 | Yang | | H02S 20/23 |
| | | | | D13/152 |
| 11,099,317 B2 * | 8/2021 | Yuan | | G02B 6/0046 |
| 11,300,269 B2 * | 4/2022 | Vasylyev | | F21V 7/0083 |
| 11,372,156 B2 * | 6/2022 | Tarsa | | G02B 6/0076 |
| 11,408,572 B2 * | 8/2022 | Lim | | G02B 6/305 |
| 11,428,887 B2 * | 8/2022 | Liefsoens | | G02B 6/44465 |
| D966,199 S * | 10/2022 | Yang | | H02S 20/23 |
| | | | | D13/152 |
| 11,549,659 B2 * | 1/2023 | Castillo | | F21V 5/002 |
| RE49,637 E * | 8/2023 | Kinnune | | F21V 29/763 |
| | | | | 315/193 |
| 11,726,284 B2 * | 8/2023 | Geens | | G02B 6/44465 |
| | | | | 385/135 |
| 11,774,047 B2 * | 10/2023 | Van Bommel | | F21K 9/62 |
| | | | | 362/84 |
| 11,822,141 B2 * | 11/2023 | Allen | | G02B 6/44528 |
| 11,874,517 B2 * | 1/2024 | Geens | | G02B 6/3894 |
| D1,015,279 S * | 2/2024 | Yang | | D13/152 |
| 11,959,631 B2 * | 4/2024 | Wassel | | F21V 7/048 |
| 2001/0019479 A1 * | 9/2001 | Nakabayashi | | G02B 6/0028 |
| | | | | 349/64 |
| 2002/0061178 A1 * | 5/2002 | Winston | | G09F 13/0409 |
| | | | | 385/11 |
| 2002/0172039 A1 * | 11/2002 | Inditsky | | G02B 6/0043 |
| | | | | 362/231 |
| 2003/0002282 A1 * | 1/2003 | Swaris | | F21V 29/70 |
| | | | | 362/249.06 |
| 2003/0034985 A1 * | 2/2003 | Needham Riddle | | G01J 1/08 |
| | | | | 345/589 |
| 2003/0117798 A1 * | 6/2003 | Leysath | | F21S 8/04 |
| | | | | 362/240 |
| 2003/0156417 A1 * | 8/2003 | Gasquet | | F21V 7/0091 |
| | | | | 362/329 |
| 2003/0227774 A1 * | 12/2003 | Martin | | F21V 29/77 |
| | | | | 362/240 |
| 2004/0008952 A1 * | 1/2004 | Kragl | | C25D 1/10 |
| | | | | 257/E33.071 |
| 2004/0037088 A1 * | 2/2004 | English | | F21S 43/195 |
| | | | | 362/652 |
| 2004/0080938 A1 * | 4/2004 | Holman | | F21S 41/12 |
| | | | | 362/245 |
| 2004/0135933 A1 * | 7/2004 | Leu | | G02B 6/0043 |
| | | | | 349/61 |
| 2004/0146241 A1 * | 7/2004 | Deladurantaye | | G02B 6/4249 |
| | | | | 385/146 |
| 2004/0213003 A1 * | 10/2004 | Lauderdale | | E04B 9/006 |
| | | | | 362/404 |
| 2004/0240217 A1 * | 12/2004 | Rice | | B60Q 1/12 |
| | | | | 362/465 |
| 2004/0264188 A1 * | 12/2004 | Tazawa | | G02B 6/0038 |
| | | | | 257/E33.071 |
| 2005/0111220 A1 * | 5/2005 | Smith | | F21V 7/0083 |
| | | | | 362/235 |
| 2005/0111235 A1 * | 5/2005 | Suzuki | | F21V 7/0091 |
| | | | | 362/555 |
| 2005/0116597 A1 * | 6/2005 | Hsu | | F21K 9/64 |
| | | | | 313/113 |
| 2005/0190564 A1 * | 9/2005 | Amano | | F21S 43/14 |
| | | | | 362/336 |
| 2005/0201103 A1 * | 9/2005 | Saccomanno | | F21V 7/005 |
| | | | | 362/341 |
| 2005/0210643 A1 * | 9/2005 | Mezei | | G02B 6/001 |
| | | | | 29/25 |
| 2006/0002146 A1 * | 1/2006 | Baba | | G02F 1/133603 |
| | | | | 362/613 |
| 2006/0051017 A1 * | 3/2006 | Hallemeier | | H04B 10/2581 |
| | | | | 385/28 |
| 2006/0056169 A1 * | 3/2006 | Lodhie | | H05B 45/40 |
| | | | | 362/97.3 |
| 2006/0076568 A1 * | 4/2006 | Keller | | G02B 19/0061 |
| | | | | 257/E33.072 |
| 2006/0120085 A1 * | 6/2006 | Hsieh | | G02B 3/08 |
| | | | | 362/338 |
| 2006/0176695 A1 * | 8/2006 | Gordin | | H05B 41/40 |
| | | | | 362/431 |
| 2006/0193139 A1 * | 8/2006 | Sun | | F21V 29/67 |
| | | | | 362/373 |
| 2006/0232984 A1 * | 10/2006 | Schuknecht | | F21V 23/026 |
| | | | | 362/345 |
| 2006/0262521 A1 * | 11/2006 | Piepgras | | F21V 29/70 |
| | | | | 362/404 |
| 2006/0262545 A1 * | 11/2006 | Piepgras | | F21S 8/06 |
| | | | | 362/373 |
| 2007/0062032 A1 * | 3/2007 | Ter-Hovhannissian | | |
| | | | | H05K 1/0203 |
| | | | | 29/846 |
| 2007/0076427 A1 * | 4/2007 | Reo | | F21V 29/70 |
| | | | | 362/555 |
| 2007/0081339 A1 * | 4/2007 | Chung | | F21V 29/74 |
| | | | | 362/373 |
| 2007/0081780 A1 * | 4/2007 | Scholl | | G02B 6/0068 |
| | | | | 385/129 |
| 2007/0086179 A1 * | 4/2007 | Chen | | G02B 6/0021 |
| | | | | 362/621 |
| 2007/0115569 A1 * | 5/2007 | Tang | | G02B 5/045 |
| | | | | 359/831 |

(56) References Cited

U.S. PATENT DOCUMENTS

| | | | | |
|---|---|---|---|---|
| 2007/0121340 A1* | 5/2007 | Hoshi | G02B 6/0036 | 362/600 |
| 2007/0121343 A1* | 5/2007 | Brown | F21V 33/0052 | 348/E7.079 |
| 2007/0139905 A1* | 6/2007 | Birman | B60Q 3/14 | 362/23.07 |
| 2007/0152231 A1* | 7/2007 | Destain | H01L 33/58 | 257/E33.073 |
| 2007/0153526 A1* | 7/2007 | Lim | F21V 19/0055 | 362/294 |
| 2007/0189033 A1* | 8/2007 | Watanabe | G02B 6/0038 | 362/606 |
| 2007/0195527 A1* | 8/2007 | Russell | F21S 8/06 | 362/240 |
| 2007/0201225 A1* | 8/2007 | Holder | G02B 19/0071 | 257/E33.073 |
| 2007/0211463 A1* | 9/2007 | Chevalier | H05B 47/175 | 700/298 |
| 2007/0217192 A1* | 9/2007 | Hiratsuka | F21V 19/0035 | 362/225 |
| 2007/0230171 A1* | 10/2007 | Hiratsuka | F21S 4/28 | 362/235 |
| 2007/0242473 A1* | 10/2007 | Lee | G02B 6/0096 | 362/551 |
| 2007/0245607 A1* | 10/2007 | Awai | G02B 6/0091 | 40/546 |
| 2007/0247856 A1* | 10/2007 | Wang | F21V 7/09 | 362/346 |
| 2007/0253058 A1* | 11/2007 | Wood | G03B 21/60 | 359/455 |
| 2007/0257610 A1* | 11/2007 | Shen | H01L 33/54 | 257/E33.059 |
| 2007/0263388 A1* | 11/2007 | Lai | F21V 14/02 | 362/287 |
| 2007/0274654 A1* | 11/2007 | Choudhury | G02B 6/136 | 385/131 |
| 2007/0278005 A1* | 12/2007 | Holmberg | H02G 3/088 | 174/655 |
| 2007/0285927 A1* | 12/2007 | Chen | F21V 29/89 | 362/346 |
| 2008/0002399 A1* | 1/2008 | Villard | F21V 17/107 | 362/184 |
| 2008/0002410 A1* | 1/2008 | Burton | F21K 9/00 | 362/294 |
| 2008/0030986 A1* | 2/2008 | Ogawa | H01L 25/0753 | 257/E25.02 |
| 2008/0037284 A1* | 2/2008 | Rudisill | F21V 23/06 | 362/629 |
| 2008/0055908 A1* | 3/2008 | Wu | F21V 29/83 | 362/373 |
| 2008/0062689 A1* | 3/2008 | Villard | F21V 14/02 | 362/249.07 |
| 2008/0062691 A1* | 3/2008 | Villard | F21V 19/02 | 362/249.16 |
| 2008/0078524 A1* | 4/2008 | Wilcox | F21V 29/763 | 165/11.1 |
| 2008/0080162 A1* | 4/2008 | Wilcox | F21V 29/75 | 362/20 |
| 2008/0080196 A1* | 4/2008 | Ruud | F21V 31/03 | 362/373 |
| 2008/0089069 A1* | 4/2008 | Medendorp | F21V 29/70 | 362/294 |
| 2008/0089070 A1* | 4/2008 | Wang | F28D 15/0275 | 362/373 |
| 2008/0123340 A1* | 5/2008 | McClellan | F21K 9/00 | 362/232 |
| 2008/0137695 A1* | 6/2008 | Takahashi | G02B 6/1228 | 372/19 |
| 2008/0179614 A1* | 7/2008 | Wang | H01L 33/54 | 257/E33.059 |
| 2008/0186273 A1* | 8/2008 | Krijn | G02F 1/133609 | 362/231 |
| 2008/0192458 A1* | 8/2008 | Li | G02B 6/005 | 313/498 |
| 2008/0192476 A1* | 8/2008 | Hiratsuka | F21S 4/20 | 362/285 |
| 2008/0198572 A1* | 8/2008 | Medendorp | F21V 9/08 | 362/84 |
| 2008/0199143 A1* | 8/2008 | Turner | G02B 19/0033 | 385/146 |
| 2008/0204888 A1* | 8/2008 | Kan | F21V 13/04 | 359/629 |
| 2008/0212329 A1* | 9/2008 | Duguay | F21V 14/02 | 362/310 |
| 2008/0219001 A1* | 9/2008 | Russell | F21V 29/763 | 362/246 |
| 2008/0231201 A1* | 9/2008 | Higley | F21V 29/74 | 315/312 |
| 2008/0239722 A1* | 10/2008 | Wilcox | F21V 31/04 | 362/268 |
| 2008/0239750 A1* | 10/2008 | Chang | F21V 13/10 | 362/296.07 |
| 2008/0239751 A1* | 10/2008 | Chang | F21V 13/12 | 362/296.07 |
| 2008/0247170 A1* | 10/2008 | Peck | F21V 7/0008 | 362/297 |
| 2008/0253122 A1* | 10/2008 | Hancock | F21S 4/28 | 362/249.12 |
| 2008/0253125 A1* | 10/2008 | Kang | F21V 29/83 | 362/294 |
| 2008/0273331 A1* | 11/2008 | Moss | H05B 45/375 | 315/309 |
| 2008/0304267 A1* | 12/2008 | Lin | F21V 19/005 | 362/294 |
| 2009/0103293 A1* | 4/2009 | Harbers | F21V 14/08 | 362/230 |
| 2009/0168395 A1* | 7/2009 | Mrakovich | F21V 31/04 | 362/223 |
| 2009/0196071 A1* | 8/2009 | Matheson | G02B 6/0021 | 362/623 |
| 2009/0257242 A1* | 10/2009 | Wendman | G02B 6/0003 | 362/553 |
| 2009/0297090 A1* | 12/2009 | Bogner | G02B 6/0028 | 385/14 |
| 2009/0309494 A1* | 12/2009 | Patterson | G09F 9/3026 | 445/24 |
| 2009/0323334 A1* | 12/2009 | Roberts | F21S 4/28 | 362/247 |
| 2010/0008088 A1* | 1/2010 | Koizumi | F21S 43/14 | 362/235 |
| 2010/0027257 A1* | 2/2010 | Boonekamp | G02B 19/0028 | 362/311.12 |
| 2010/0046219 A1* | 2/2010 | Pijlman | G02B 6/0036 | 362/235 |
| 2010/0053959 A1* | 3/2010 | Ijzerman | G02B 6/0073 | 362/327 |
| 2010/0073597 A1* | 3/2010 | Bierhuizen | G02B 6/0021 | 349/62 |
| 2010/0079843 A1* | 4/2010 | Derichs | G02B 26/02 | 359/263 |
| 2010/0079980 A1* | 4/2010 | Sakai | G02B 6/0016 | 362/311.06 |
| 2010/0102730 A1* | 4/2010 | Simon | F21V 23/0457 | 324/403 |
| 2010/0118531 A1* | 5/2010 | Montagne | G02B 19/0061 | 359/708 |
| 2010/0128483 A1* | 5/2010 | Reo | F21V 5/00 | 362/249.02 |
| 2010/0133422 A1* | 6/2010 | Lin | F24S 23/00 | 250/227.11 |
| 2010/0141153 A1* | 6/2010 | Recker | H05B 45/357 | 315/149 |
| 2010/0157577 A1* | 6/2010 | Montgomery | G02B 6/0018 | 362/97.2 |
| 2010/0195335 A1* | 8/2010 | Allen | F21V 5/048 | 362/335 |
| 2010/0202142 A1* | 8/2010 | Morgan | F21S 11/00 | 362/346 |

(56) References Cited

U.S. PATENT DOCUMENTS

| | | | | |
|---|---|---|---|---|
| 2010/0208460 A1* | 8/2010 | Ladewig | F21V 29/75 | 362/249.02 |
| 2010/0220484 A1* | 9/2010 | Shani | G02B 6/0025 | 362/296.09 |
| 2010/0220497 A1* | 9/2010 | Ngai | G02B 6/006 | 362/610 |
| 2010/0231143 A1* | 9/2010 | May | F21K 9/62 | 315/312 |
| 2010/0238645 A1* | 9/2010 | Bailey | G02B 19/0028 | 362/296.01 |
| 2010/0238671 A1* | 9/2010 | Catone | F21S 8/086 | 362/373 |
| 2010/0290234 A1* | 11/2010 | Bierhuizen | F21V 5/04 | 257/E33.068 |
| 2010/0301360 A1* | 12/2010 | van de Ven | F21V 3/02 | 257/E33.061 |
| 2010/0301769 A1* | 12/2010 | Chemel | H05B 47/199 | 315/294 |
| 2010/0302218 A1* | 12/2010 | Bita | G02B 6/0065 | 345/204 |
| 2010/0302616 A1* | 12/2010 | Bita | G02B 6/0036 | 264/1.24 |
| 2010/0302783 A1* | 12/2010 | Shastry | G02B 19/0061 | 359/727 |
| 2010/0302803 A1* | 12/2010 | Bita | G02B 6/0036 | 362/612 |
| 2010/0309677 A1* | 12/2010 | Kazaoka | F21S 43/249 | 362/519 |
| 2010/0315833 A1* | 12/2010 | Holman | F21K 9/23 | 362/606 |
| 2010/0320904 A1* | 12/2010 | Meir | G02B 6/0061 | 315/32 |
| 2010/0328936 A1* | 12/2010 | Pance | H01L 33/08 | 257/89 |
| 2011/0007505 A1* | 1/2011 | Wang | F21V 5/045 | 362/235 |
| 2011/0013397 A1* | 1/2011 | Catone | F21V 19/0055 | 362/244 |
| 2011/0013420 A1* | 1/2011 | Coleman | F21S 8/06 | 362/613 |
| 2011/0037388 A1* | 2/2011 | Lou | F21K 9/232 | 313/46 |
| 2011/0044022 A1* | 2/2011 | Ko | G02B 19/0061 | 313/501 |
| 2011/0044582 A1* | 2/2011 | Travis | G02B 5/045 | 359/641 |
| 2011/0058372 A1* | 3/2011 | Lerman | F21V 19/005 | 362/249.02 |
| 2011/0063830 A1* | 3/2011 | Narendran | F21V 5/004 | 977/774 |
| 2011/0063838 A1* | 3/2011 | Dau | F21V 21/16 | 362/235 |
| 2011/0063843 A1* | 3/2011 | Cook | F21V 29/75 | 362/249.02 |
| 2011/0063855 A1* | 3/2011 | Vissenberg | G02B 6/0038 | 362/311.12 |
| 2011/0122616 A1* | 5/2011 | Hochstein | F21V 15/01 | 362/249.02 |
| 2011/0163681 A1* | 7/2011 | Dau | F21V 23/06 | 315/294 |
| 2011/0163683 A1* | 7/2011 | Steele | F21V 7/06 | 315/192 |
| 2011/0164853 A1* | 7/2011 | Corbille | G02B 6/445 | 174/50.5 |
| 2011/0170289 A1* | 7/2011 | Allen | F21K 9/60 | 362/310 |
| 2011/0180818 A1* | 7/2011 | Lerman | H01L 25/0753 | 257/88 |
| 2011/0187273 A1* | 8/2011 | Summerford | H05B 47/10 | 315/250 |
| 2011/0193105 A1* | 8/2011 | Lerman | F21K 9/64 | 257/E33.061 |
| 2011/0193106 A1* | 8/2011 | Lerman | H01L 33/08 | 257/E33.061 |
| 2011/0193114 A1* | 8/2011 | Lerman | F21K 9/20 | 257/91 |
| 2011/0195532 A1* | 8/2011 | Lerman | H01L 25/0753 | 257/E33.061 |
| 2011/0198632 A1* | 8/2011 | Lerman | H01L 33/08 | 257/91 |
| 2011/0199769 A1* | 8/2011 | Bretschneider | F21V 13/14 | 362/249.02 |
| 2011/0204390 A1* | 8/2011 | Lerman | F21K 9/20 | 257/E33.061 |
| 2011/0204391 A1* | 8/2011 | Lerman | F21K 9/20 | 257/E27.121 |
| 2011/0210861 A1* | 9/2011 | Winton | G08B 7/062 | 340/815.45 |
| 2011/0228527 A1* | 9/2011 | Van Gorkom | G02B 27/145 | 362/231 |
| 2011/0233568 A1* | 9/2011 | An | F21S 8/086 | 257/E33.055 |
| 2011/0248287 A1* | 10/2011 | Yuan | H01L 33/60 | 257/E33.056 |
| 2011/0249467 A1* | 10/2011 | Boonekamp | F21K 9/61 | 362/555 |
| 2011/0261570 A1* | 10/2011 | Okada | F21S 43/239 | 362/311.06 |
| 2011/0273079 A1* | 11/2011 | Pickard | H01L 33/504 | 313/483 |
| 2011/0273882 A1* | 11/2011 | Pickard | F21K 9/68 | 362/296.08 |
| 2011/0280043 A1* | 11/2011 | Van Ostrand | G02B 6/0028 | 362/606 |
| 2011/0299807 A1* | 12/2011 | Kim | G01N 21/7746 | 385/12 |
| 2011/0305018 A1* | 12/2011 | Angelini | F21V 17/104 | 362/238 |
| 2011/0305027 A1* | 12/2011 | Ham | F21V 29/507 | 362/373 |
| 2011/0317436 A1* | 12/2011 | Kuan | F21V 19/02 | 362/373 |
| 2012/0008338 A1* | 1/2012 | Ono | G02B 6/0041 | 362/606 |
| 2012/0019942 A1* | 1/2012 | Morgan | G02B 19/0028 | 359/853 |
| 2012/0026728 A1* | 2/2012 | Lou | F21V 7/005 | 362/217.05 |
| 2012/0026828 A1* | 2/2012 | Fjellstad | B63B 21/66 | 367/17 |
| 2012/0033445 A1* | 2/2012 | Desmet | G02B 6/0038 | 362/606 |
| 2012/0039073 A1* | 2/2012 | Tong | F21V 7/0008 | 362/373 |
| 2012/0051041 A1* | 3/2012 | Edmond | F21V 29/75 | 362/296.01 |
| 2012/0068615 A1* | 3/2012 | Duong | A01G 9/249 | 313/503 |
| 2012/0069575 A1* | 3/2012 | Koh | G02B 6/0046 | 362/257 |
| 2012/0069579 A1* | 3/2012 | Koh | G02B 6/0046 | 362/307 |
| 2012/0069595 A1* | 3/2012 | Catalano | G02B 6/0021 | 362/555 |
| 2012/0075870 A1* | 3/2012 | Kayanuma | F21V 5/045 | 362/333 |
| 2012/0113537 A1* | 5/2012 | Minano | F21V 7/04 | 359/834 |
| 2012/0113676 A1* | 5/2012 | Van Dijk | G02B 6/0078 | 362/606 |
| 2012/0114284 A1* | 5/2012 | Ender | G02B 27/143 | 385/32 |
| 2012/0120651 A1* | 5/2012 | Peck | F21S 4/28 | 362/249.02 |
| 2012/0140461 A1* | 6/2012 | Pickard | F21V 7/0091 | 362/225 |
| 2012/0152490 A1* | 6/2012 | Wen | F21V 29/70 | 165/104.26 |

(56) References Cited

U.S. PATENT DOCUMENTS

| | | | | |
|---|---|---|---|---|
| 2012/0170266 A1* | 7/2012 | Germain | F21V 33/006 | 29/428 |
| 2012/0170316 A1* | 7/2012 | Lee | G02B 6/0036 | 362/617 |
| 2012/0170318 A1* | 7/2012 | Tsai | G02B 6/0021 | 362/630 |
| 2012/0182767 A1* | 7/2012 | Petcavich | G09F 13/18 | 359/599 |
| 2012/0188774 A1* | 7/2012 | Okada | F21S 43/241 | 362/299 |
| 2012/0212957 A1* | 8/2012 | Hyun | F21V 19/0045 | 362/241 |
| 2012/0230019 A1* | 9/2012 | Peifer | F21V 21/048 | 362/147 |
| 2012/0250296 A1* | 10/2012 | Lu | F21S 8/046 | 362/147 |
| 2012/0250319 A1* | 10/2012 | Dau | F21V 23/06 | 362/249.02 |
| 2012/0257383 A1* | 10/2012 | Zhang | F21V 5/02 | 362/327 |
| 2012/0268931 A1* | 10/2012 | Lerman | F21V 19/005 | 362/249.02 |
| 2012/0268932 A1* | 10/2012 | Lerman | H05K 1/0204 | 362/249.02 |
| 2012/0287619 A1* | 11/2012 | Pickard | F21K 9/232 | 362/231 |
| 2012/0287654 A1* | 11/2012 | He | F21V 21/116 | 362/431 |
| 2012/0287677 A1* | 11/2012 | Wheatley | G02B 6/0068 | 362/627 |
| 2012/0298181 A1* | 11/2012 | Cashion | H01L 31/0543 | 136/246 |
| 2012/0307496 A1* | 12/2012 | Phillips, III | F21V 5/04 | 257/E33.056 |
| 2012/0320626 A1* | 12/2012 | Quilici | G02B 6/0035 | 362/606 |
| 2012/0326614 A1* | 12/2012 | Tsuji | H05B 45/10 | 315/200 R |
| 2013/0003363 A1* | 1/2013 | Lu | F21V 5/045 | 362/326 |
| 2013/0010464 A1* | 1/2013 | Shuja | F21V 29/00 | 362/249.02 |
| 2013/0028557 A1* | 1/2013 | Lee | G02B 6/2813 | 385/28 |
| 2013/0033867 A1* | 2/2013 | Coplin | F21V 13/04 | 362/373 |
| 2013/0037838 A1* | 2/2013 | Speier | H01L 22/10 | 118/620 |
| 2013/0038219 A1* | 2/2013 | Dau | H05B 45/59 | 315/297 |
| 2013/0039050 A1* | 2/2013 | Dau | F21V 7/0033 | 362/217.05 |
| 2013/0044480 A1* | 2/2013 | Sato | F21S 8/061 | 362/235 |
| 2013/0077298 A1* | 3/2013 | Steele | F21V 13/14 | 362/249.06 |
| 2013/0088890 A1* | 4/2013 | Knapp | G02B 6/0038 | 362/609 |
| 2013/0107518 A1* | 5/2013 | Boyer | F21V 15/01 | 362/235 |
| 2013/0107527 A1* | 5/2013 | Boyer | F21V 7/0083 | 362/241 |
| 2013/0107528 A1* | 5/2013 | Boyer | F21S 8/033 | 362/243 |
| 2013/0107553 A1* | 5/2013 | Desai | B64D 47/06 | 362/235 |
| 2013/0128593 A1* | 5/2013 | Luo | F21V 25/00 | 362/362 |
| 2013/0155675 A1* | 6/2013 | Wassel | F21V 7/048 | 315/312 |
| 2013/0170210 A1* | 7/2013 | Athalye | F21V 29/51 | 362/249.02 |
| 2013/0194811 A1* | 8/2013 | Benitez | G02B 27/0961 | 362/311.1 |
| 2013/0201715 A1* | 8/2013 | Dau | F21V 23/003 | 362/551 |
| 2013/0208461 A1* | 8/2013 | Warton | F21V 21/116 | 362/217.05 |
| 2013/0208495 A1* | 8/2013 | Dau | G02B 1/045 | 362/551 |
| 2013/0214300 A1* | 8/2013 | Lerman | H01L 33/08 | 257/88 |
| 2013/0215612 A1* | 8/2013 | Garcia | F21V 11/00 | 362/248 |
| 2013/0223057 A1* | 8/2013 | Gassner | F21V 3/04 | 362/223 |
| 2013/0229804 A1* | 9/2013 | Holder | G02B 19/0071 | 362/244 |
| 2013/0229810 A1* | 9/2013 | Pelka | G02B 19/0061 | 362/311.06 |
| 2013/0250584 A1* | 9/2013 | Wang | F21V 23/0464 | 362/362 |
| 2013/0279198 A1* | 10/2013 | Lin | G02B 6/0011 | 362/616 |
| 2013/0286637 A1* | 10/2013 | Lay | F21S 8/04 | 362/147 |
| 2013/0294059 A1* | 11/2013 | Galluccio | F21V 7/0008 | 362/217.05 |
| 2013/0294063 A1* | 11/2013 | Lou | F21V 7/04 | 362/217.05 |
| 2013/0300310 A1* | 11/2013 | Hu | H05B 45/3725 | 315/254 |
| 2013/0315833 A1* | 11/2013 | Julius | G01N 33/58 | 424/9.2 |
| 2013/0343045 A1* | 12/2013 | Lodhie | F21V 23/02 | 362/249.02 |
| 2013/0343055 A1* | 12/2013 | Eckert | F21V 31/03 | 362/362 |
| 2013/0343079 A1* | 12/2013 | Unger | F21V 13/04 | 362/555 |
| 2014/0001507 A1* | 1/2014 | Streppel | F21V 5/045 | 359/619 |
| 2014/0003041 A1* | 1/2014 | Dau | F21S 8/068 | 362/147 |
| 2014/0029257 A1* | 1/2014 | Boyer | F21S 8/086 | 362/235 |
| 2014/0036510 A1* | 2/2014 | Preston | F21V 5/00 | 362/296.01 |
| 2014/0049961 A1* | 2/2014 | Wilcox | F21V 29/75 | 362/244 |
| 2014/0071687 A1* | 3/2014 | Tickner | F21V 21/04 | 362/382 |
| 2014/0168955 A1* | 6/2014 | Gershaw | F21S 8/026 | 362/225 |
| 2014/0211457 A1* | 7/2014 | Tarsa | F21K 9/61 | 362/147 |
| 2014/0211476 A1* | 7/2014 | Yuan | G02B 6/0036 | 385/39 |
| 2014/0211495 A1* | 7/2014 | Yuan | G02B 6/0035 | 362/555 |
| 2014/0211497 A1* | 7/2014 | Yuan | G02B 6/002 | 362/555 |
| 2014/0211502 A1* | 7/2014 | Keller | G02B 6/0031 | 362/608 |
| 2014/0211504 A1* | 7/2014 | Yuan | G02B 6/0078 | 385/39 |
| 2014/0211508 A1* | 7/2014 | Yuan | G02B 6/0031 | 385/88 |
| 2014/0212090 A1* | 7/2014 | Wilcox | F21K 9/23 | 385/27 |
| 2014/0226337 A1* | 8/2014 | Timmers | F21V 23/04 | 362/293 |
| 2014/0268879 A1* | 9/2014 | Mizuyama | G02B 6/0043 | 362/625 |
| 2014/0313727 A1* | 10/2014 | Dupre | F21S 8/036 | 362/368 |
| 2014/0334126 A1* | 11/2014 | Speier | F21V 5/04 | 362/307 |

(56)                    References Cited

U.S. PATENT DOCUMENTS

| | | | | |
|---|---|---|---|---|
| 2014/0347885 A1* | 11/2014 | Wilcox | F21S 8/061 | 362/612 |
| 2014/0355297 A1* | 12/2014 | Castillo | F21V 7/0091 | 362/582 |
| 2014/0355302 A1* | 12/2014 | Wilcox | F21V 23/0464 | 362/609 |
| 2015/0003059 A1* | 1/2015 | Haitz | G02B 19/0028 | 362/235 |
| 2015/0049507 A1* | 2/2015 | Shani | G02B 6/0061 | 362/609 |
| 2015/0055369 A1* | 2/2015 | Tarsa | G02B 6/0085 | 362/613 |
| 2015/0055371 A1* | 2/2015 | van de Ven | G02B 6/0078 | 362/612 |
| 2015/0109820 A1* | 4/2015 | Wilcox | G02B 6/262 | 385/47 |
| 2015/0160396 A1* | 6/2015 | Wilcox | G02B 6/32 | 362/555 |
| 2015/0168664 A1* | 6/2015 | Coenegracht | G02B 6/4446 | 385/135 |
| 2015/0253488 A1* | 9/2015 | Wilcox | G02B 6/305 | 362/619 |
| 2015/0345715 A1* | 12/2015 | Castillo | F21V 23/0464 | 362/373 |
| 2015/0354786 A1* | 12/2015 | Ji | H05B 45/20 | 362/240 |
| 2016/0170164 A1* | 6/2016 | Pasek | G02B 6/4478 | 385/136 |
| 2016/0202441 A1* | 7/2016 | Claessens | G02B 6/3897 | 385/113 |
| 2016/0302281 A1* | 10/2016 | Wassel | H05B 47/16 | |
| 2017/0010431 A1* | 1/2017 | Coenegracht | G02B 6/4446 | |
| 2017/0030566 A1* | 2/2017 | Milam | F21V 21/14 | |
| 2017/0059135 A1* | 3/2017 | Jones | F21V 29/763 | |
| 2017/0108648 A1* | 4/2017 | Smith | G02B 6/3897 | |
| 2017/0168221 A1* | 6/2017 | Wilcox | G02B 6/32 | |
| 2017/0307204 A1* | 10/2017 | Cattoni | F21V 29/89 | |
| 2018/0041018 A1* | 2/2018 | Thompson | H02G 15/013 | |
| 2018/0196215 A1* | 7/2018 | Claessens | G02B 6/4477 | |
| 2018/0252887 A1* | 9/2018 | Coenegracht | H02G 15/013 | |
| 2018/0254622 A1* | 9/2018 | Thompson | H05K 5/0004 | |
| 2019/0293888 A1* | 9/2019 | Bryon | H02G 15/013 | |
| 2020/0057221 A1* | 2/2020 | Desard | G02B 6/4439 | |
| 2021/0191057 A1* | 6/2021 | Liefsoens | G02B 6/4477 | |
| 2021/0199263 A1* | 7/2021 | Castillo | F21V 5/002 | |
| 2021/0215898 A1* | 7/2021 | Claessens | G02B 6/4477 | |
| 2021/0255409 A1* | 8/2021 | Geens | G02B 6/4444 | |
| 2021/0373267 A1* | 12/2021 | Radelet | H02G 15/013 | |
| 2021/0373271 A1* | 12/2021 | Geens | G02B 6/4472 | |
| 2022/0196950 A1* | 6/2022 | Geens | G02B 6/44465 | |
| 2022/0214514 A1* | 7/2022 | Geens | G02B 6/4473 | |
| 2022/0337044 A1* | 10/2022 | Vastmans | G02B 6/44775 | |
| 2023/0054905 A1* | 2/2023 | Liefsoens | G02B 6/445 | |
| 2023/0145954 A1* | 5/2023 | Allen | H02G 3/263 | 248/49 |
| 2023/0151944 A1* | 5/2023 | Castillo | F21V 3/02 | 385/27 |
| 2023/0161127 A1* | 5/2023 | Schurmans | H02G 15/013 | 385/135 |
| 2023/0417382 A1* | 12/2023 | Wilcox | G02B 6/002 | |

OTHER PUBLICATIONS

BUDI Connectorized with FIST: Building Distribution Enclosure for Connectorized Applications, COMMSCOPE®, 1-6 (2016).

Fiber Optic Simplex Plug, 1 page (Dated Oct. 20, 2016).

BUDI-2S-Patch Installation Instruction, TC-1212-IP, Rev A, CommScope, Inc, 8 pages (Apr. 2017).

BUDI-2S-S-NNN-NN-T12 Installation Instruction, TC-1257-NN-IP, Rev A, CommScope, Inc, 4 pages (Apr. 2017).

BUDI-M-TH-BT Installation Instructions, TC-1242-BT-SIP-UK, Ver 0, issue 6, CommScope, Inc, 6 pages (Jun. 2018).

* cited by examiner

500

| Provide First and Second Parts of Device | 502 |

| Strip Outer Protective Jacket | 504 |

| Wrap Foam Tape | 506 |

| Assemble First and Second Parts Around a Cable | 508 |

| Apply Resin to Seal Cable inside Cavity Between First and Second Parts | 510 |

| Insert Device into Cable Port | 512 |

DEVICE AND METHOD FOR SEALING CABLES IN TELECOMMUNICATIONS ENCLOSURES OF DIFFERENT TYPES WITH THE SAME DEVICE

CROSS-REFERENCE TO RELATED APPLICATION

This application is a National Stage Application of PCT/EP2021/059642, filed on Apr. 14, 2021, which claims the benefit of U.S. Patent Application Ser. No. 63/010,332, filed on Apr. 15, 2020, the disclosures of which are incorporated herein by reference in their entireties. To the extent appropriate, a claim of priority is made to each of the above disclosed applications.

BACKGROUND

In a typical fiber optic distribution network, sealed and re-enterable enclosures are used to provide access to optical fibers from one or more fiber optic cables. For example, the optical fibers from multi-fiber distribution cables can be accessed within the enclosures.

Splice trays, patch panels, and various optical components can be provided within the enclosures. In certain examples, the enclosures include ruggedized adapter ports for allowing pre-connectorized drop cables to be connected to the optical fibers from the distribution cable. In some further examples, the optical fibers from the distribution cable are spliced inside the enclosures to optical fibers corresponding to drop cables that are routed out of the enclosure through sealed ports. Effective sealing is an important consideration relating to outdoor enclosures used in fiber optic distribution networks.

In certain examples, a distribution cable is looped through an enclosure such that the distribution cable can pass through multiple enclosures in the distribution network. It can be challenging to seal the locations where the looped distribution cable enters and exits the enclosure. For this and other reasons, improvements are desirable.

SUMMARY

Aspects of the present disclosure relate to a device and method for providing effective sealing with regard to telecommunication enclosures. In certain aspects, the device assembles around a cable to effectively seal the cable and/or the ports of an enclosure where the cable enters and/or exits the enclosure.

In one aspect, a device for sealing a telecommunications cable includes a first part; a second part having one or more attachment members that assemble onto the first part to assemble the first and second parts together; and a cavity defined between the first and second parts that extends along a central axis and between first and second ends of the device; wherein the cavity is structured to seal the cable between the first and second parts without threading the cable through the first and second ends, and the first and second parts define at least one mounting location for a cable port in a telecommunications enclosure.

In another aspect, a method of sealing a telecommunications cable includes providing first and second parts of a device; striping a portion of the outer protective jacket; assembling the first and second parts around a portion of the cable; applying a resin to seal the portion of the cable inside a cavity defined between the first and second parts of the device; and inserting the device into a cable port of a telecommunications enclosure. In some cases, the method includes positioning or wrapping an outer device around the outer protective jacket of the cable.

In another aspect, a device for sealing a telecommunications cable includes a first part; a second part having one or more attachment members that assemble onto the first part to assemble the first and second parts together; and a cavity defined between the first and second parts that extends along a central axis between first and second ends of the device; wherein the cavity is structured to receive a cable between the first and second parts without having to thread the cable through the first and second ends.

In a further aspect, the first and second parts define a first mounting location structured to mount to a port in a first type of enclosure and a second mounting location structured to mount to a port in a second type of enclosure.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

DESCRIPTION OF THE FIGURES

The following drawing figures, which form a part of this application, are illustrative of described technology and are not meant to limit the scope of the disclosure in any manner.

DETAILED DESCRIPTION

Figure 1:
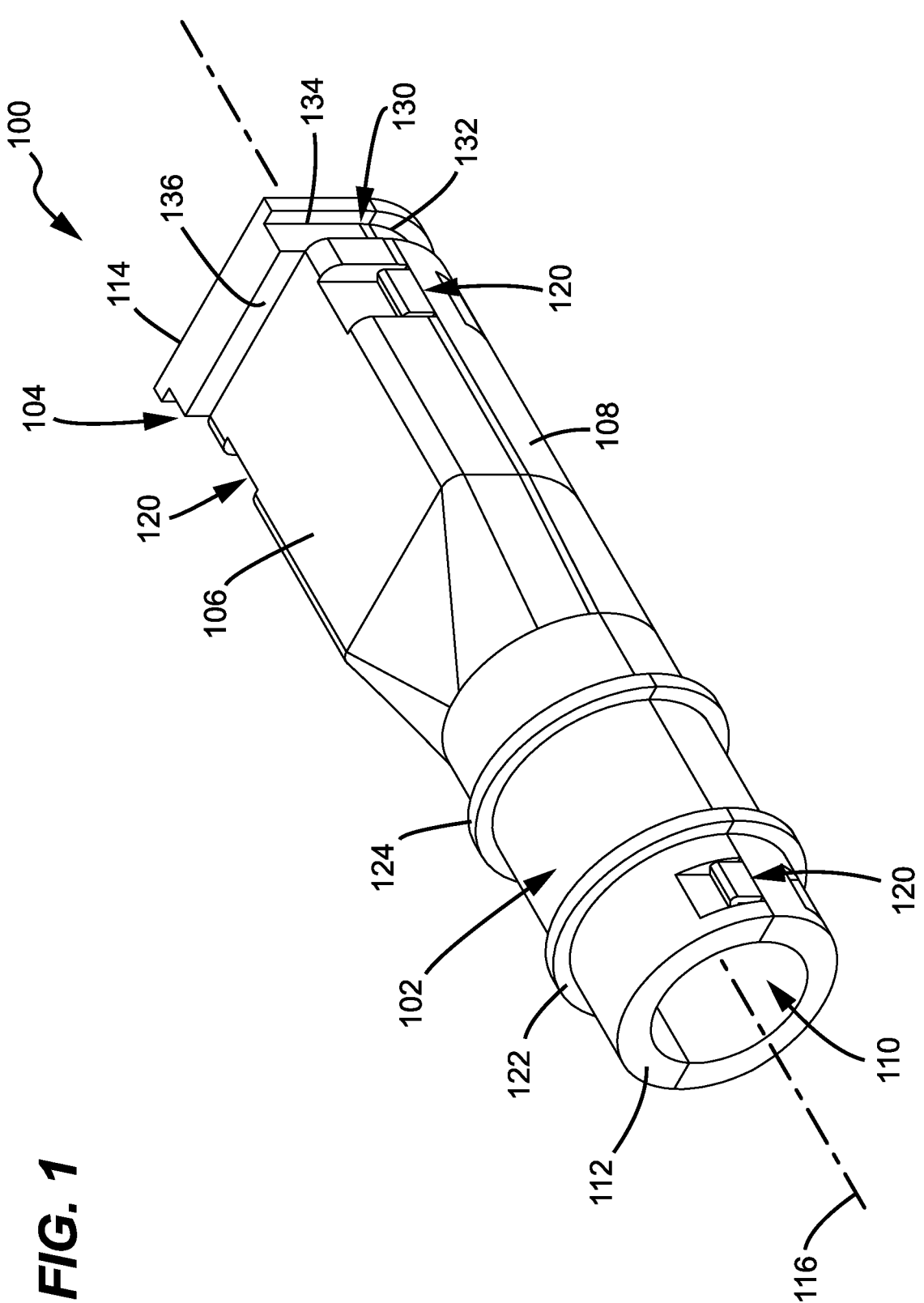
FIG. 1 is a perspective view of a device for sealing a telecommunications cable.
Figure 2:
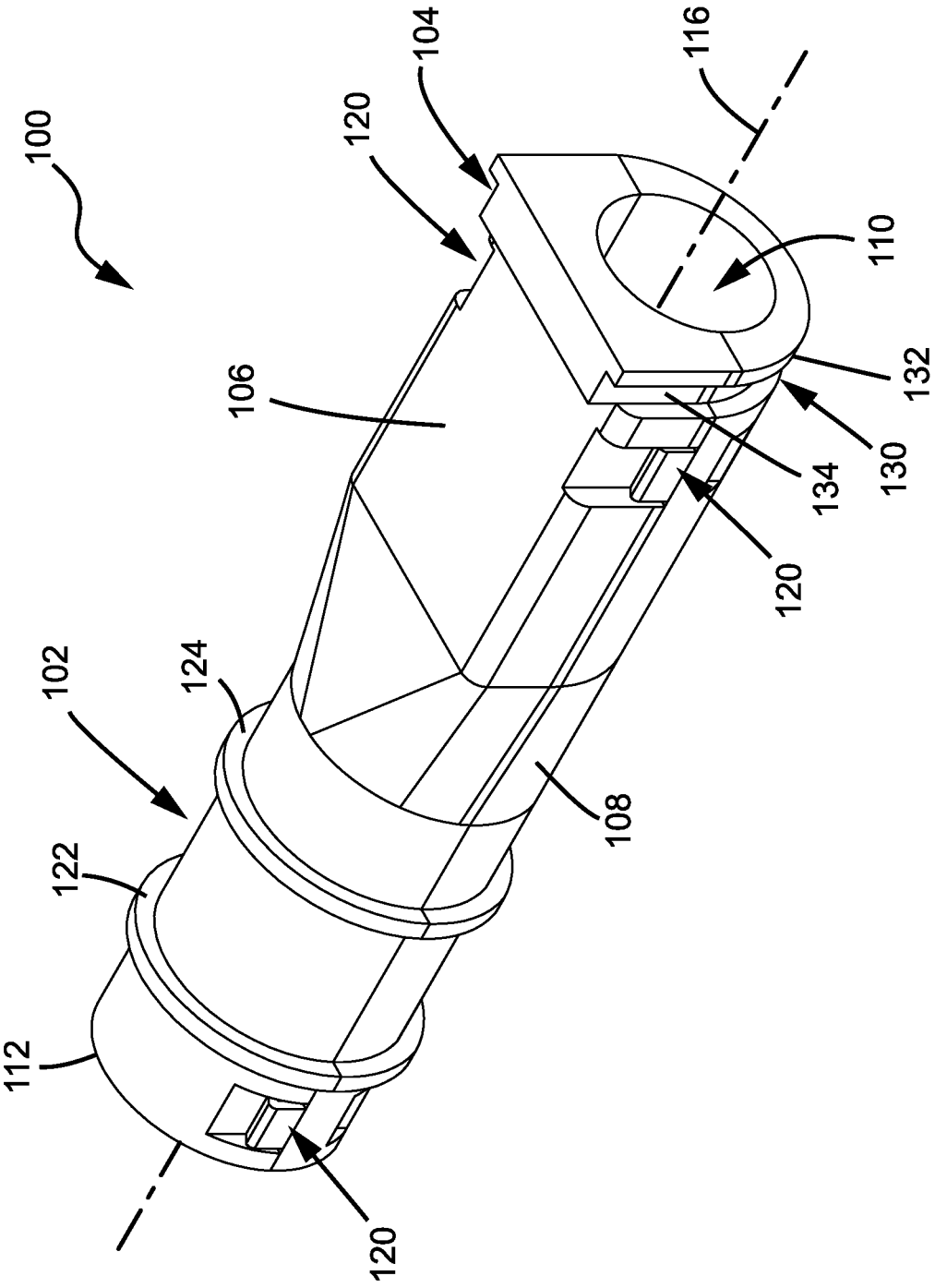
FIG. 2 is another perspective view of the device.
Figure 3:
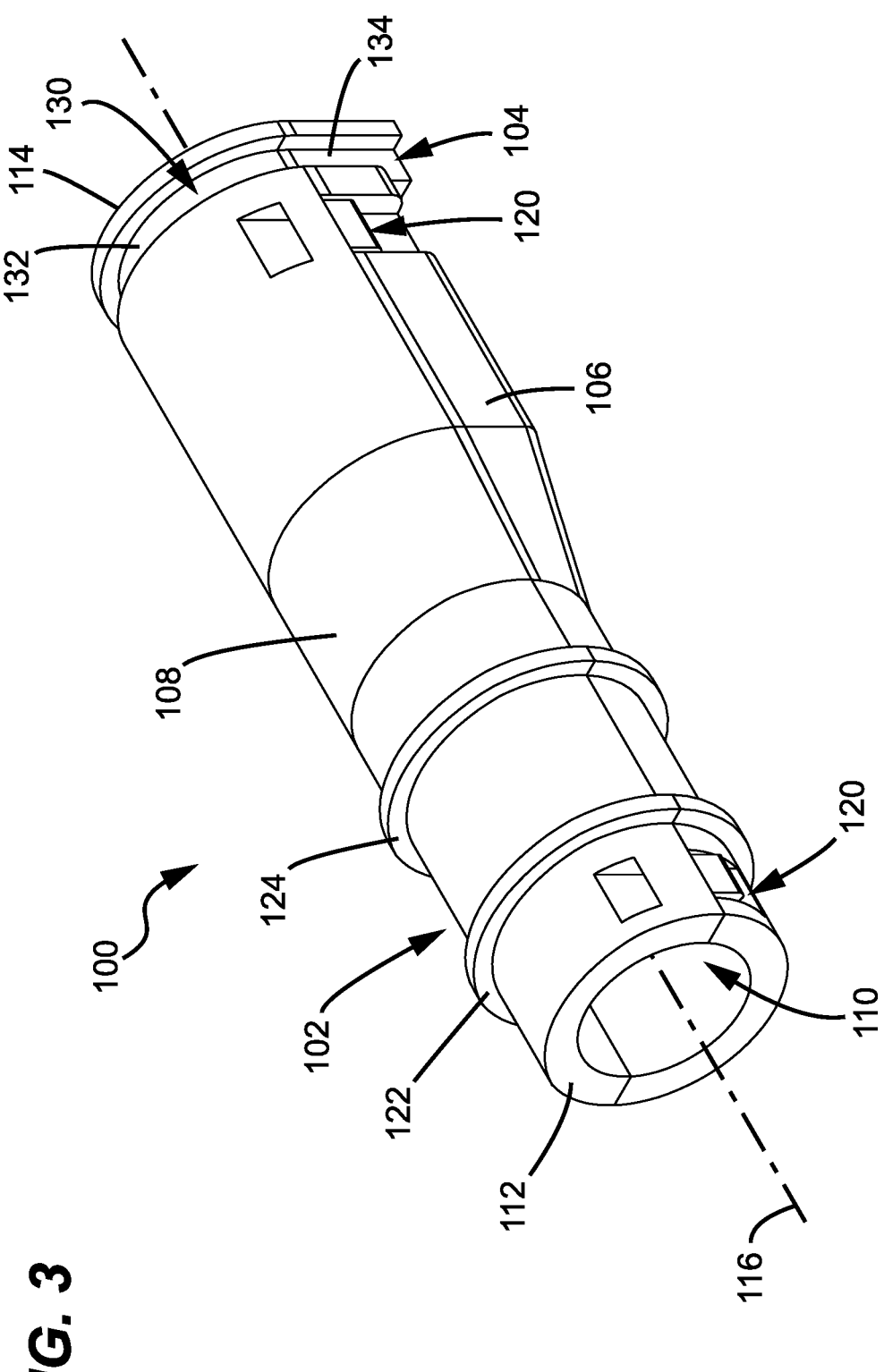
FIG. 3 is a perspective view of the device.
Figure 4:
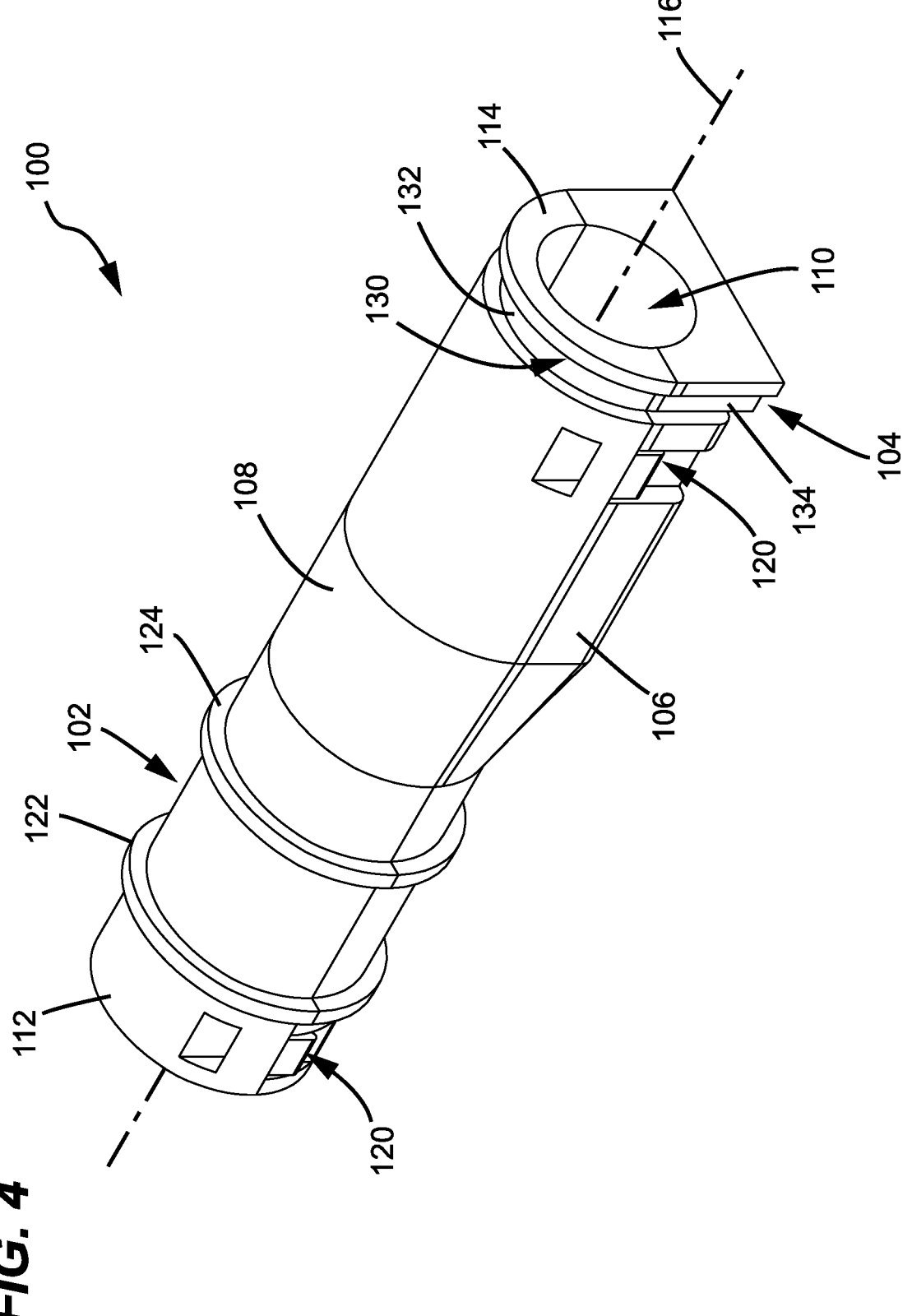
FIG. 4 is another perspective view of the device.
Figures 5, 6:
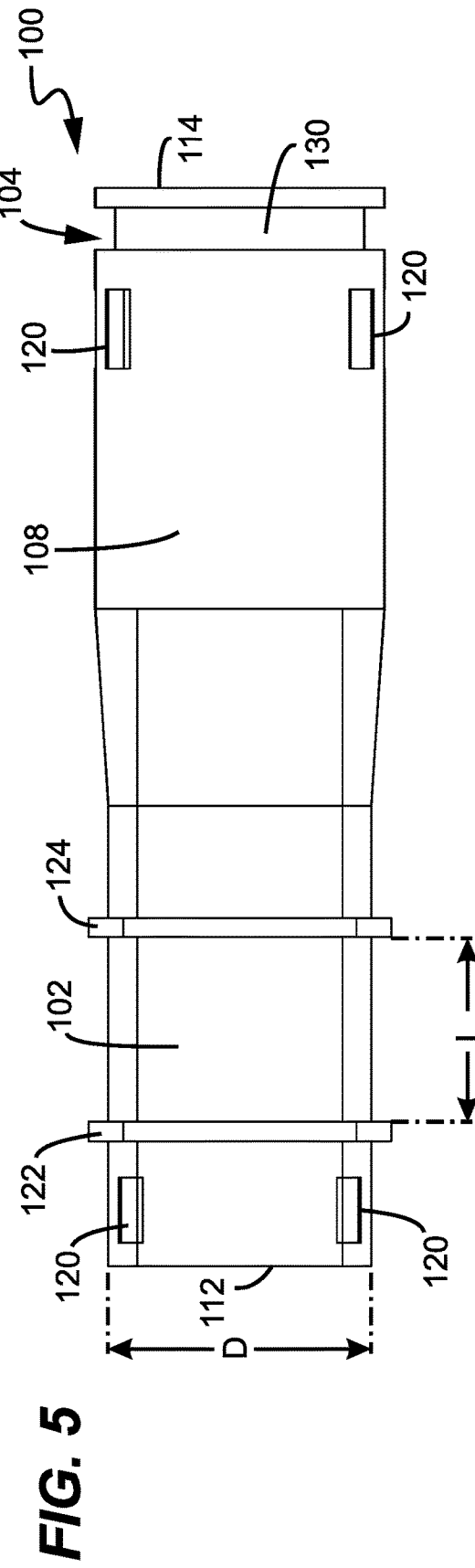
FIG. 5 is a top view of the device.
FIG. 6 is a bottom view of the device.
Figures 7, 8:
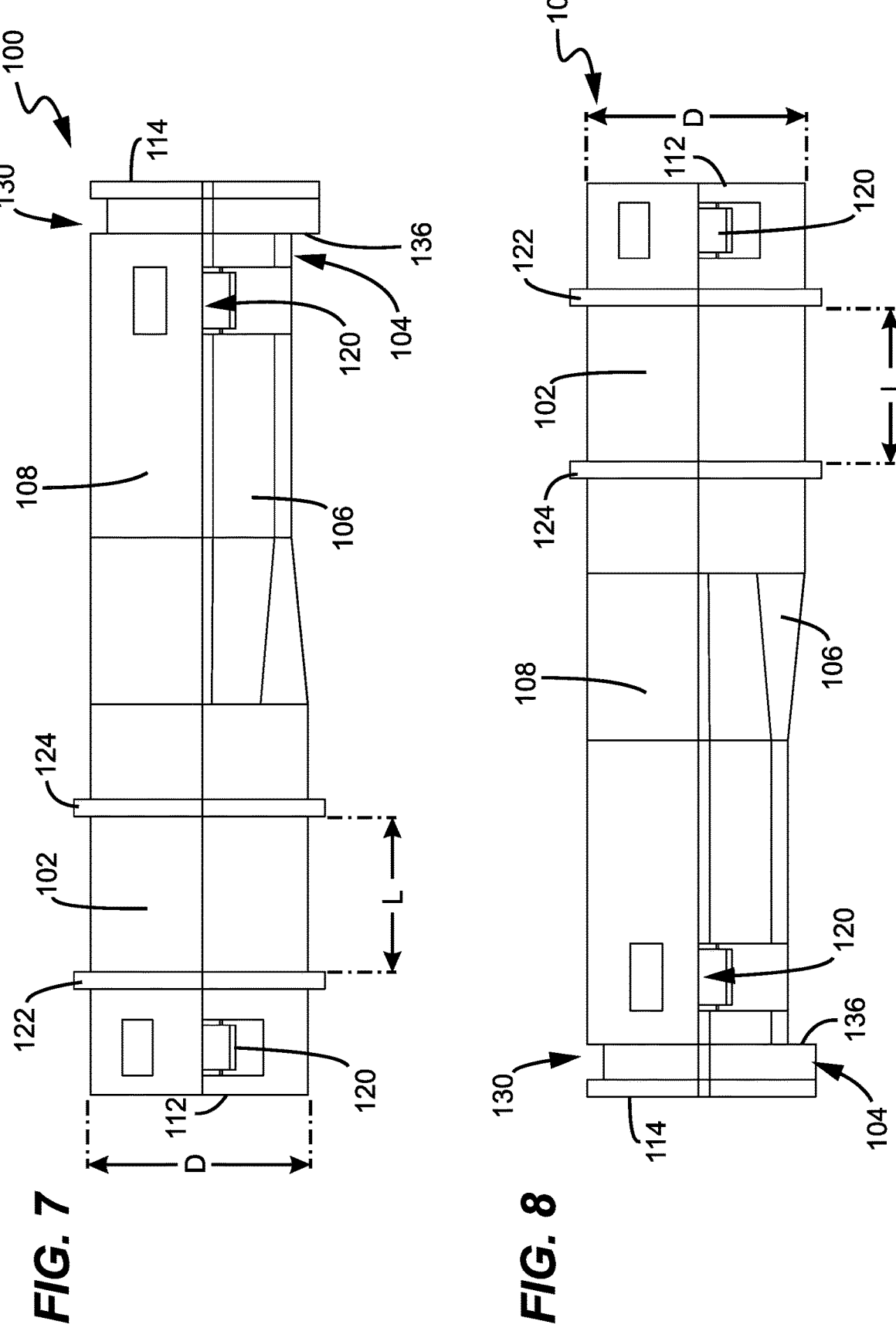
FIG. 7 is a right side view of the device.
FIG. 8 is a left side view of the device.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

There are one or more reasons to seal an end of a cable used in connection with an enclosure. One reason is prevent the escape of pressuring test gas placed into the cable interior to check for cuts or breakages of the cable. Another reason may be to prevent the entry of moisture or gas into an interior of an enclosure.

In certain embodiments, an inert gas is injected into a telecommunications cable such as a multi-fiber distribution cable. The inert gas is used to pressurize the cable to detect a leakage or breakage in the cable, and to also prevent moisture from entering inside the cable.

Additionally, in certain embodiments, an inert gas is injected into a telecommunications enclosure where various telecommunications cables are routed therein. The inert gas may be used to pressurize the enclosure to ensure that there are no leaks or damage to the enclosure. As will be described in more detail, a device 100 is structured to seal a pressurized telecommunications cable, and/or to seal a cable port of one or more types of telecommunications enclosures.

FIGS. 1-4 are perspective views of the device 100. Referring now to FIGS. 1-4, the device 100 defines a cavity 110 that is structured to surround a cable such as a pressurized multi-fiber distribution cable, and that is structured to receive a resin to seal the cable inside the cavity 110. In certain embodiments, the device 100 is structured to seal a telecommunications cable such as the telecommunications cable 400 shown in FIG. 21. The resin is a flowable adhesive that cures to seal an interior of the cable, and around any extending fiber tubes that extend out of the cable and continue on into the enclosure.

The interface between the device 100 and resin also creates a fixation from axial pulls or pushes on the cable, in some embodiments. Additionally, in some embodiments, the interior and/or the exterior of the enclosure may include fixation structures which fix onto the outer jacket and/or strength members of the cable.

Figure 12:
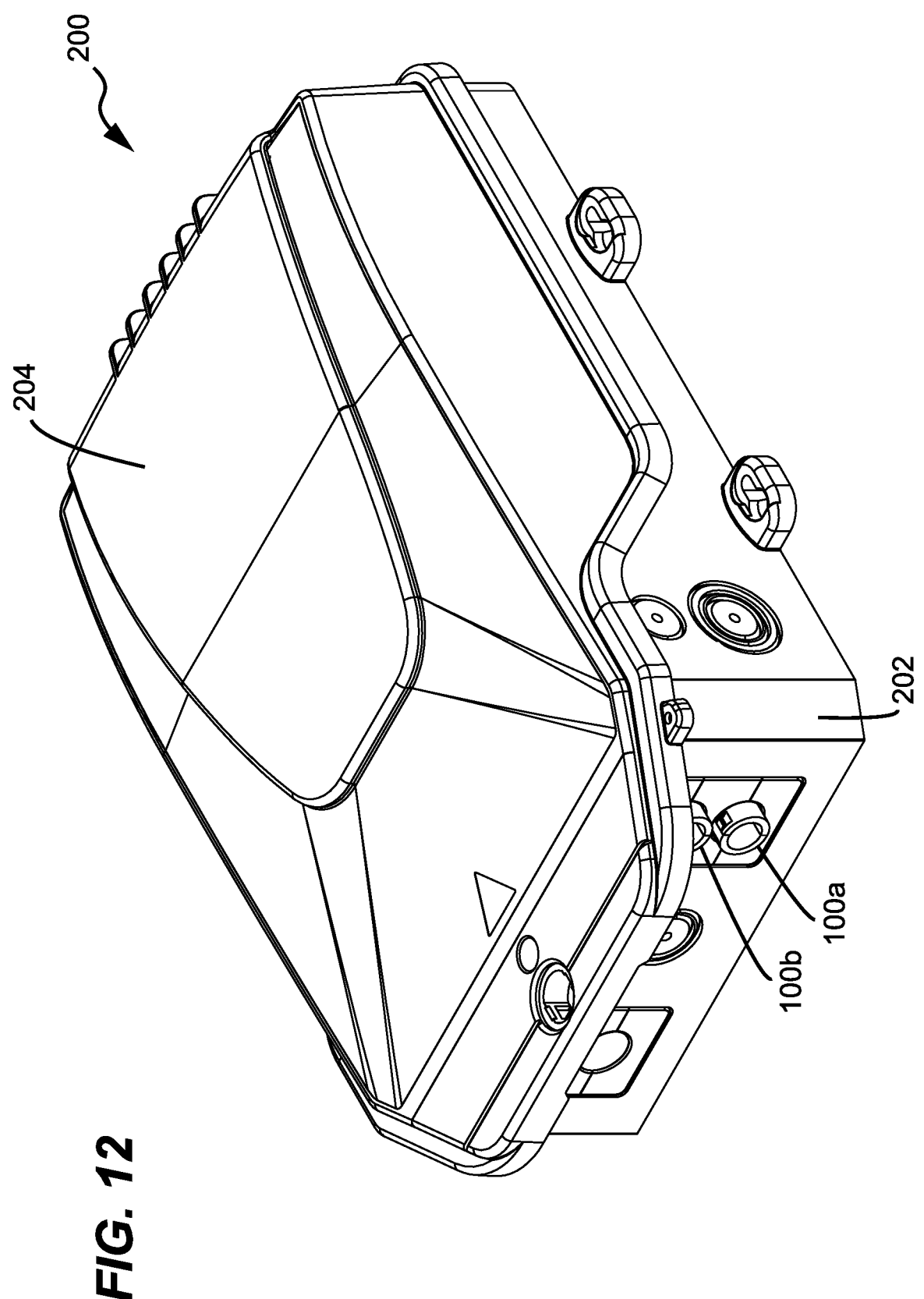
FIG. 12 is a front perspective view of devices in accordance with the embodiment of FIGS. 1-11 mounted inside cable ports of a first type of enclosure.
Figure 13:
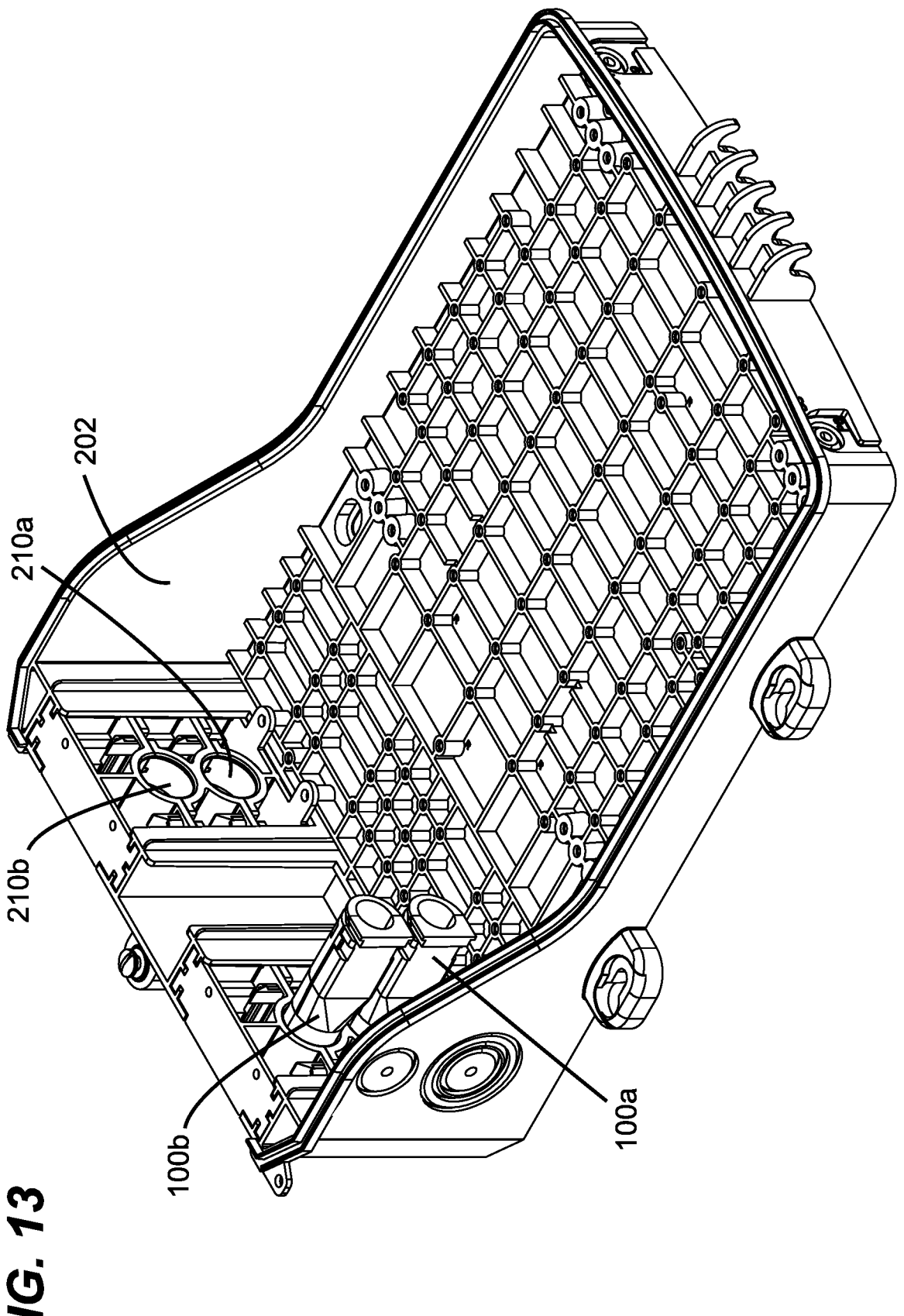
FIG. 13 is a rear perspective view of the devices mounted in the first type of enclosure, with a cover of the first type of enclosure removed.
Figure 14:
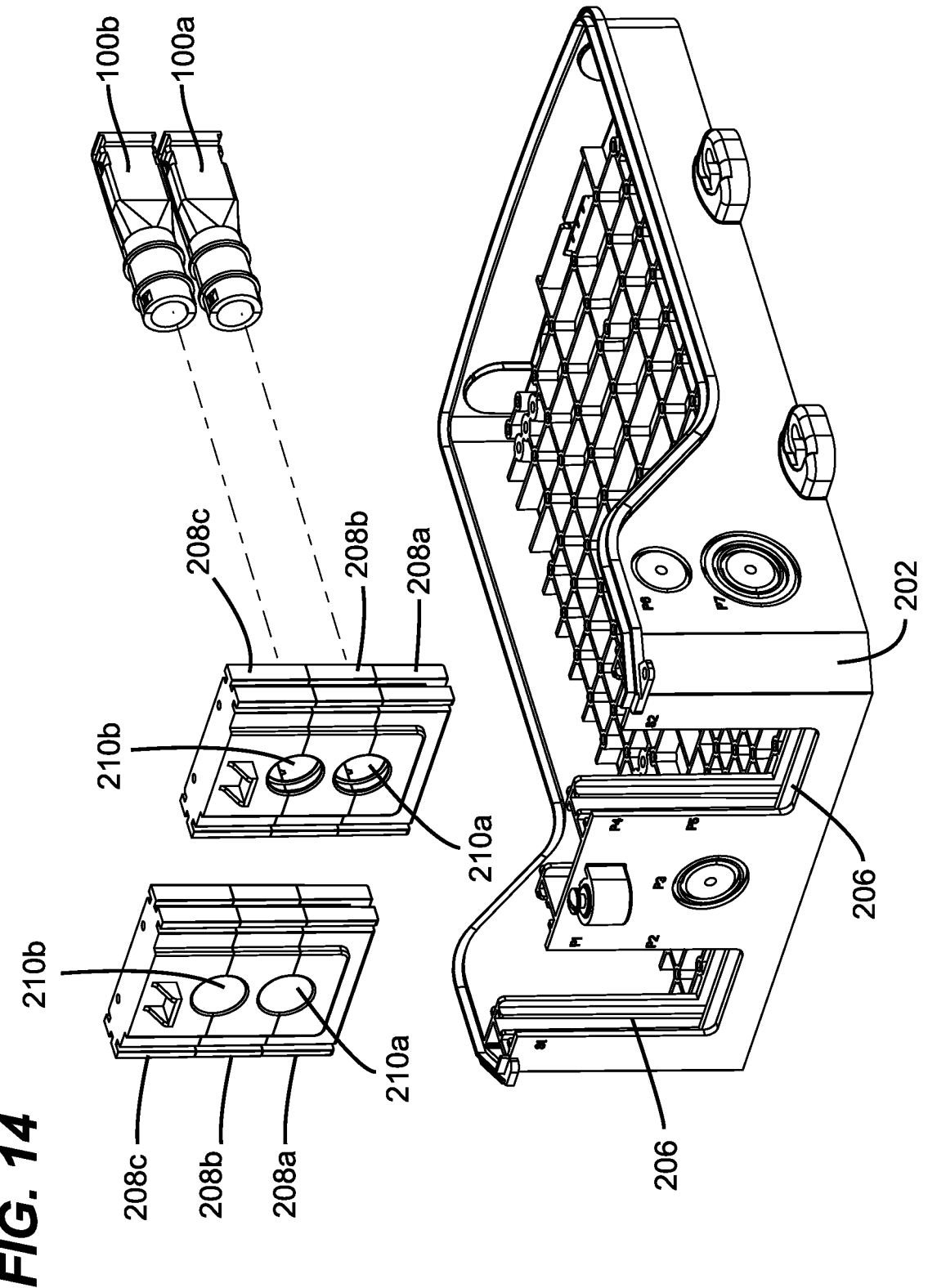
FIG. 14 is an exploded perspective view showing an assembly of the devices and the first type of enclosure.

The device 100 further includes a first mounting location 102 for sealing a cable port in a first type of enclosure such as the enclosure 200 shown in FIGS. 12-14, and a second mounting location 104 for sealing a cable port in a second type of enclosure such as the enclosure 300 shown in FIGS. 15-20. Accordingly, in certain embodiments, the device 100 is structured to seal the cable ports of one or more types of telecommunications enclosures. Enclosures 200, 300 can include cable splices, splitters, and/or cable connectors and mating adapters, as desired.

The device 100 includes first and second parts 106, 108 that are structured for assembly in the field. As shown in FIGS. 1-4, the first and second parts 106, 108 are assembled together at one or more attachment locations 120. In certain embodiments, the first and second parts 106, 108 snap-fit together such that the device 100 can be readily assembled in the field.

When assembled together, the first and second parts 106, 108 define the cavity 110 that extends along a central axis 116 of the device 100 between a first end 112 and a second end 114 of the device 100. The cavity 110 is structured to surround a cable that enters or exits an enclosure such as a multi-fiber distribution cable or a drop cable. Additionally, the cavity 110 is also structured to receive a resin to seal the cable inside the cavity 110.

Advantageously, by providing the first and second parts 106, 108 that assemble together, the device 100 can be wrapped around the cable without having to thread the cable through the cavity 110. Thus, the device 100 can be attached to a middle portion of the cable that is distant from the distal ends of the cable. In one example, device 100 is configured to wrap around a loop cable that is looped through the enclosure.

In some examples, an outer device can be positioned around the cable at a location where it is desired to assemble the device 100 around the cable before the first and second parts 106, 108 are assembled together. In some examples, the outer device is foam tape that can be wrapped around the cable. The outer device can be of a predetermined thickness. The outer device can help ensure that the cable is held snuggly inside the cavity 110 and prevent the cable from sliding relative to the device 100 after the first and second parts 106, 108 are assembled around the cable. The outer device, such as foam tape, can increase the sealing effect from resin. Also, the outer device can increase the cable thickness, and is appreciated to be an optional feature in some embodiments. The outer device can allow device 100 to be used with a variety of cable sizes.

In the examples depicted in the figures, the cavity 110 has a substantially circular cross-sectional shape to accommodate cables having a circular cross-section. However, it is possible for the cavity 110 have a plurality of different shapes and sizes to accommodate a variety of different cables, or multiple cables grouped together, having different shapes and sizes.

FIGS. 5-8 are top, bottom, right side, and left side views, respectively, of the device 100. Referring now to FIGS. 1-8, the first mounting location 102 is a rounded exterior surface defined between first and second projections 122, 124 that extend radially from the central axis 116. The first mounting location 102 extends around the central axis 116.

In the embodiment depicted in the figures, the first and second projections 122, 124 are circular rims that extend around the central axis 116, and the first mounting location 102 is a cylindrical exterior surface that is defined between the first and second projections 122, 124. As shown in FIGS. 5-8, a distance between the first and second projections 122, 124 defines a length L of the cylindrical exterior surface of the first mounting location 102, and the diameter of the cavity 110 combined with the thickness of the first and second parts 106, 108 defines an outside diameter D of the cylindrical exterior surface of the first mounting location 102.

Referring back to FIGS. 1-4, the second mounting location 104 includes a groove 130 that extends at least partially around the central axis 116. The groove 130 has first and second portions 132, 134. In the embodiment depicted in the figures, the first portion 132 is substantially semi-circular, and the second portion 134 of the groove 130 is substantially linear.

Additionally, the second mounting location 104 includes a surface 136 that is orthogonal to the central axis 116. The surface 136 is structured to interface with a cover 304 of the enclosure 300 to secure the device 100 inside a cable port of the enclosure 300.

Figure 9:
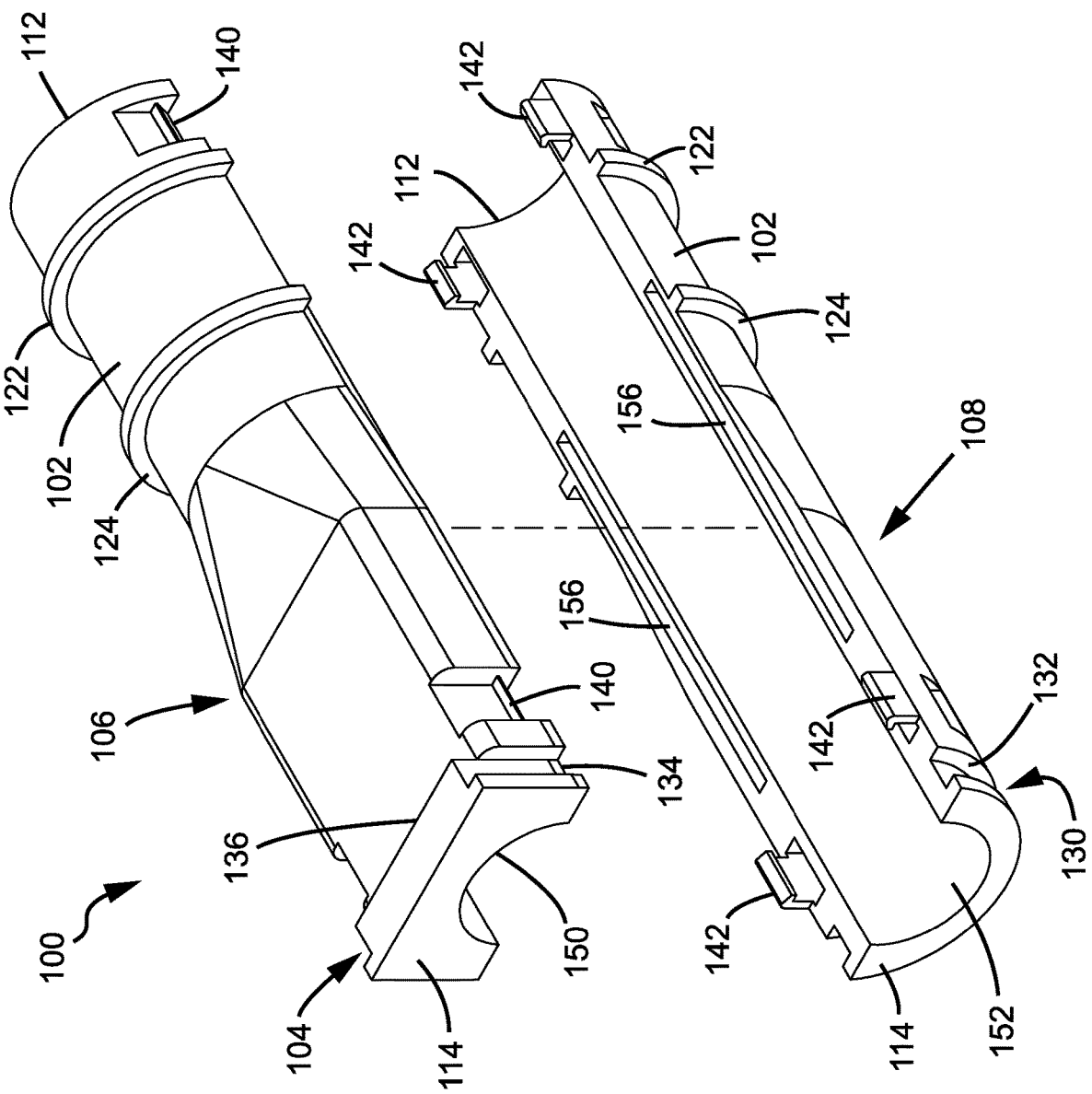
FIG. 9 is an exploded perspective view of the device.
Figure 10:
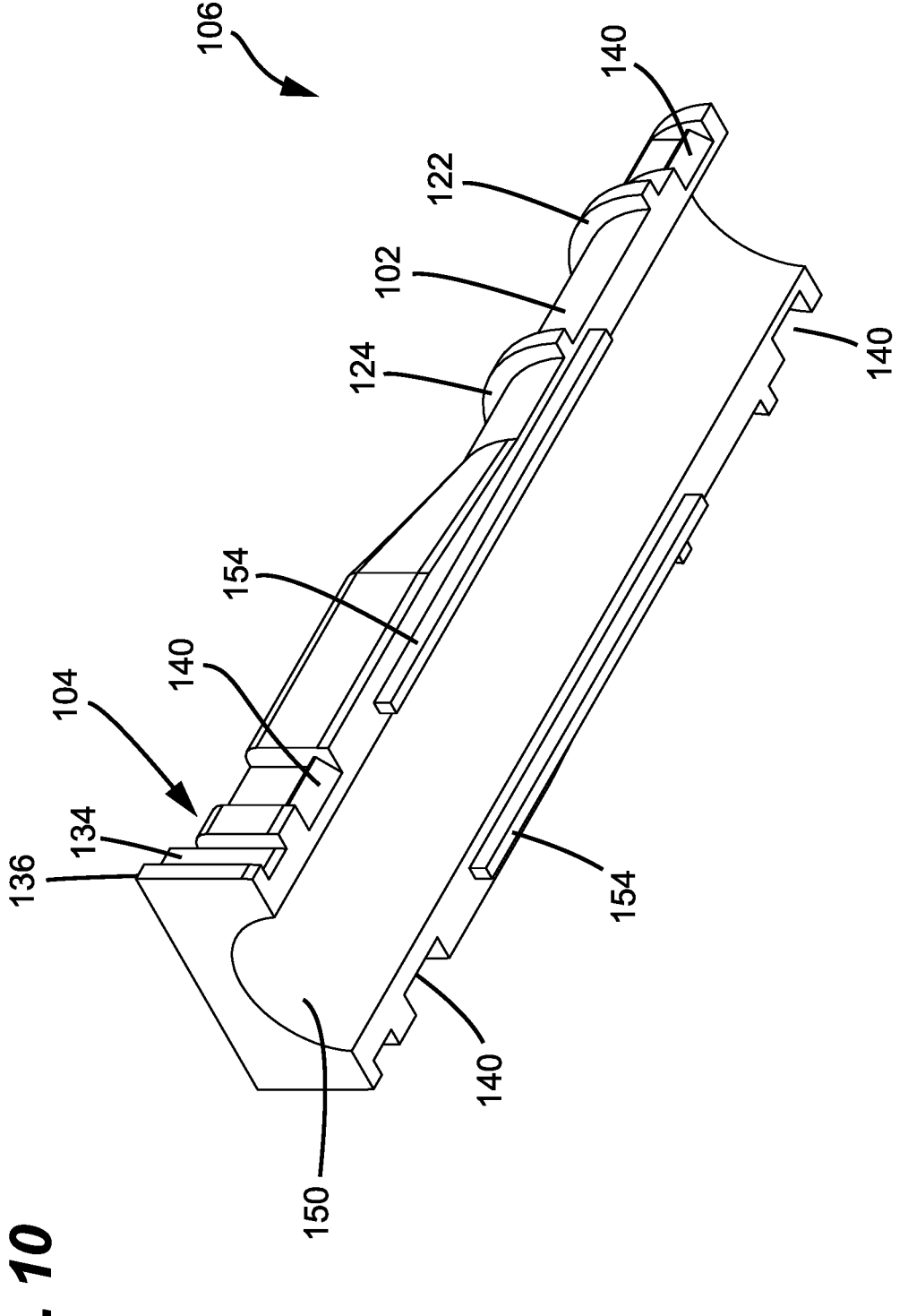
FIG. 10 is a bottom perspective view of a first part of the device.
Figure 11:
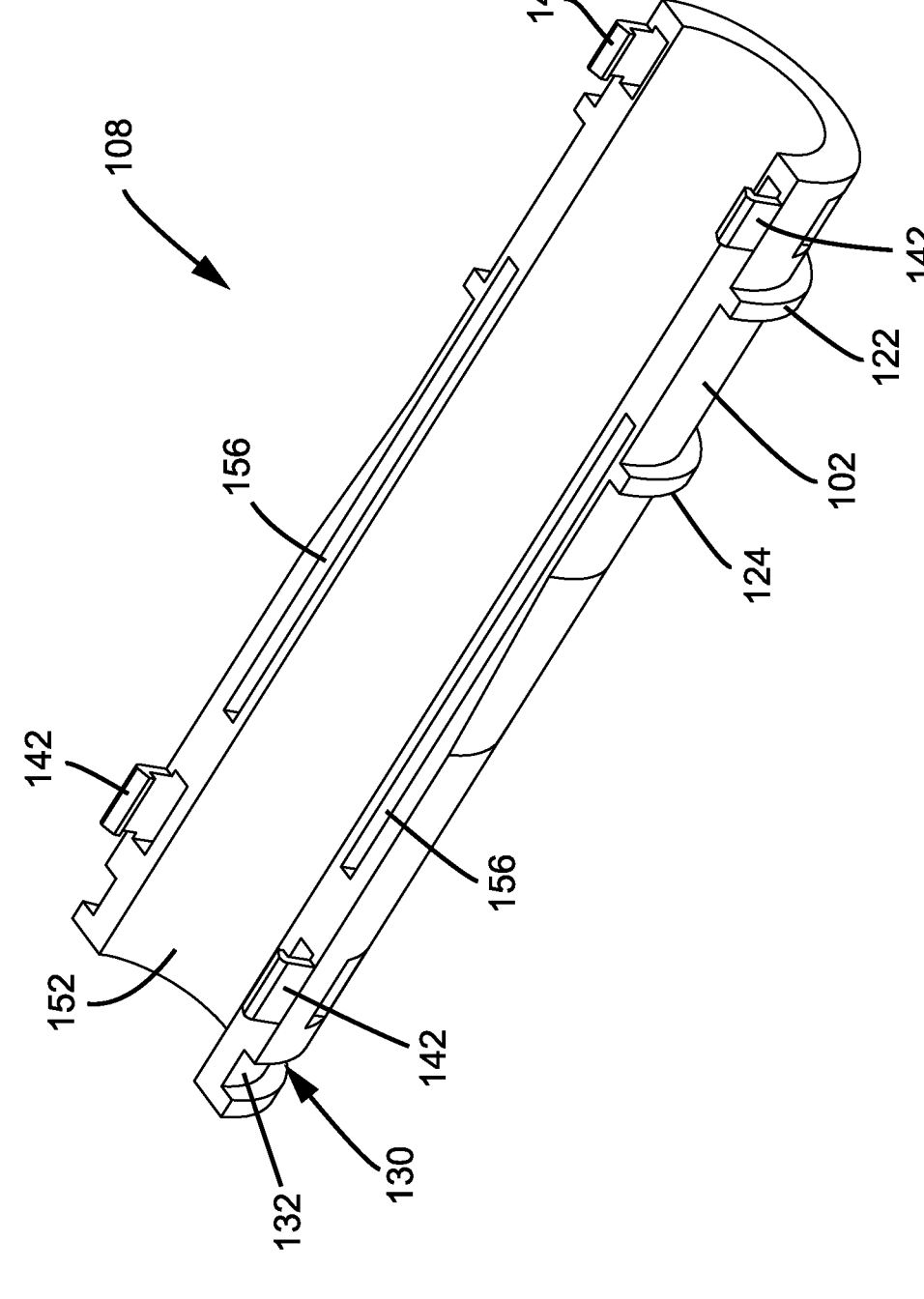
FIG. 11 is a top perspective view of a second part of the device.

FIG. 9 is an exploded perspective view of the device 100. FIG. 10 is a bottom perspective view of the first part 106 of the device 100, and FIG. 11 is a top perspective view of the second part 108 of the device 100. Referring now to FIGS. 9-11, the rounded exterior surface of the first mounting location 102 is partially defined by the first part 106 and is also partially defined by the second part 108. Additionally, the first and second projections 122, 124 are partially defined by the first part 106 and are also partially defined by the second part 108. As also shown in these figures, the first portion 132 of the groove 130 is defined by the second part 108, and the second portion 134 and surface 136 are defined by the first part 106.

The attachment locations 120 each include an attachment member 140 of a first type, and an attachment member 142 of a second type. In certain embodiments, the attachment members 142 are latch members that snap-fit onto mating surfaces of the attachment members 140. For example, the attachment members 140 each include a flat mating surface and a sloped surface. The attachment members 142 each include a sloped surface that causes the attachment members 142 to flex when engaging the sloped surface of the attachment member 140 such that a flat mating surface of each attachment member 142 is able to latch onto the flat mating surface of each corresponding attachment member 140.

While the embodiment depicted in the figures shows the first part 106 as having the attachment members 140 of the first type, and the second part 108 as having the attachment members 142 of the second type, in alternative embodiments the first part 106 can have the attachment members 142 of the second type, and the second part 108 can have the attachment members 140 of the first type. Also, in alternative embodiments, the first part 106 can have attachment members 140, 142 of both the first and second types, and the second part 108 can have attachment members 140, 142 of both the first and second types.

Still referring now to FIGS. 9-11, the first part 106 includes an interior surface 150 that partially defines the cavity 110. For example, the interior surface 150 is a concave surface. Similarly, the second part 108 also includes an interior surface 152 that partially defines the cavity 110. The interior surface 152 is also a concave surface. Accordingly, when the first and second parts 106, 108 are assembled by snap fitting the attachment members 140, 142 together, the cavity 110 is formed by the interior surfaces 150, 152 of the first and second parts.

As shown in FIG. 10, the first part 106 includes at least one alignment rib 154. In some examples, the at least one alignment rib 154 extends parallel to the central axis 116. In some examples, the first part 106 includes a pair of alignment ribs 154 on opposite sides of the interior surface 150, such as in the example depicted in FIG. 10.

As shown in FIGS. 9 and 11, the second part 108 includes at least one alignment groove 156. In some examples, the at least one alignment groove 156 extends parallel to the central axis 116. In some examples, the second part 108 includes a pair of alignment grooves 156 on opposite sides of the interior surface 152, such as in the example depicted in FIGS. 9 and 11. The alignment grooves 156 are structured to receive the alignment ribs 154 on the first part 106 to align the first and second parts 106, 108 together during their assembly.

While the embodiment depicted in the figures shows the first part 106 as having the alignment ribs 154, and the second part 108 as having the alignment grooves 156, in alternative embodiments the first part 106 can have the alignment grooves 156, and the second part 108 can have the alignment ribs 154. Also, in alternative embodiments, the first part 106 can have an alignment rib 154 and an alignment groove 156, and the second part 108 can have a corresponding alignment groove 156 and a corresponding alignment rib 154.

FIG. 12 is a front perspective view of devices 100a, 100b mounted in the first type of enclosure 200. FIG. 13 is a rear perspective view of the devices 100a, 100b mounted in the enclosure 200, with the cover of the enclosure removed. FIG. 14 is an exploded perspective view showing an assembly of the devices 100a, 100b. Referring now to FIGS. 12-14, the enclosure 200 includes a base 202 and a cover 204. The base 202 defines a cable seal opening 206 where one or more cable seals 208 are mounted. The cable seals 208 define cable ports 210a, 210b for cables such as multi-fiber distribution cables to enter and exit the enclosure 200. In certain embodiments, the enclosure 200 is pressurized with an inert gas and the devices 100a, 100b seal the cable ports 210a, 210b to prevent the gas from escaping out of the pressurized enclosure.

The first mounting location 102 of the devices 100a, 100b is configured to mount inside the cable ports 210a, 210b. For example, the first projection 122 is structured to engage an exterior surface of the cable seals 208, and the second projection 124 is structured to engage an interior surface of the cable seals 208 to secure the rounded exterior surface of the first mounting location 102 between the exterior and interior surfaces of the cable seals 208.

The cable seals 208 are stacked inside the cable seal opening 206 of the base 202. In the configuration illustrated in the figures, three cable seals 208a-208c are stacked inside each cable seal opening 206. For example, a first cable seal 208a is stacked inside each cable seal opening 206 followed by a second cable seal 208b. The cable seals 208a, 208b define a first cable port 210a. A third cable seal 208c is thereafter stacked in each cable seal opening 206, and the cable seals 208b, 208c define a second cable port 210b in each cable seal opening 206.

The devices 100a, 100b are inserted into the first and second cable ports 210a, 210b by mounting the first cable seal 208a in the cable seal opening 206, mounting the first mounting location 102 of the device 100a onto the first cable seal 208a, and thereafter mounting the second cable seal 208b over the first cable seal 208a and the device 100a, and thereby capturing the device 100a inside the first cable port 210a. Next, the device 100b is mounted over the second cable seal 208b, and the third cable seal 208c is mounted over the second cable seal 208b and the device 100b, and thereby capturing the device 100b inside the second cable port 210b.

In some embodiments, a rubber gasket, a resin, or other type of sealant can be positioned around the first mounting location 102 of the device 100a to provide an improved seal between the device 100a and the first and second cable seals 208, 208b in the first cable port 210a. Likewise, a sealant such as a rubber gasket, a resin, or other type of sealant can be positioned around the first mounting location 102 of the device 100*b* to provide an improved seal between the device 100*b* and the second and third cable seals 208*b*, 208*c* in the second cable port 210*b*.

Figure 15:
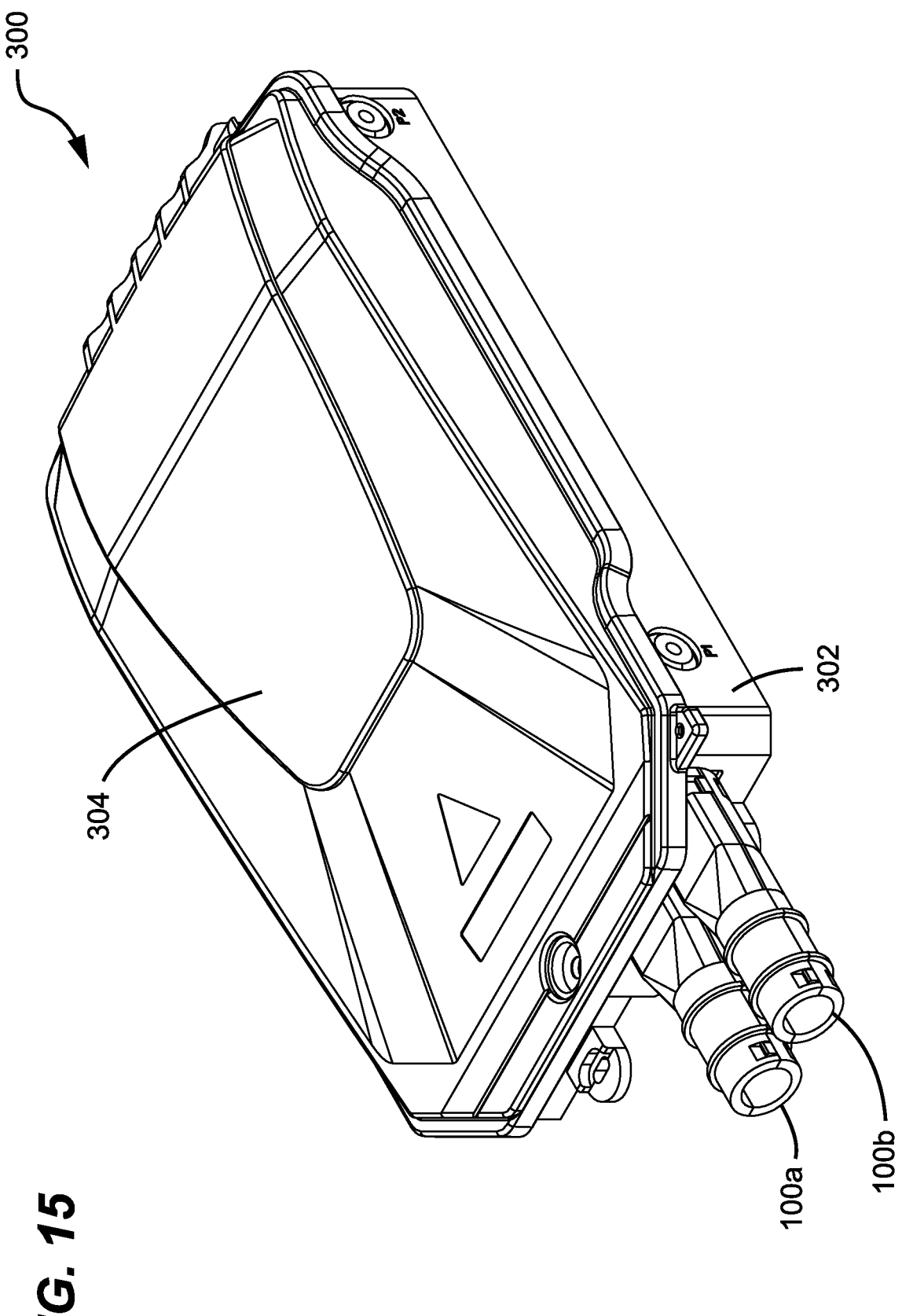
FIG. 15 is a top perspective view of devices in accordance with the embodiment of FIGS. 1-11 mounted inside cable ports of a second type of enclosure.
Figure 16:
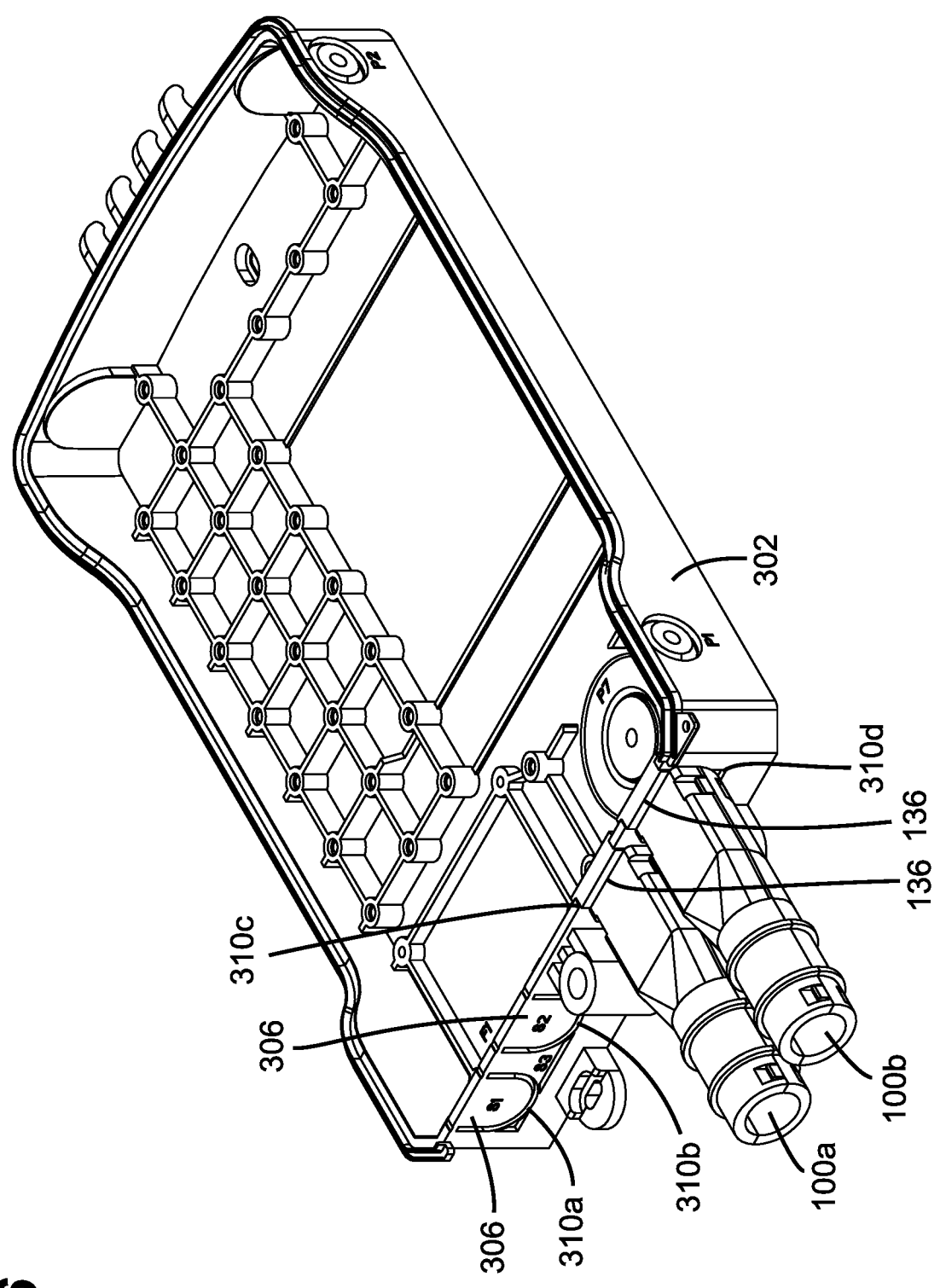
FIG. 16 is a top perspective view of the devices mounted in the second type of enclosure, with a cover of the second type of enclosure removed.
Figure 17:
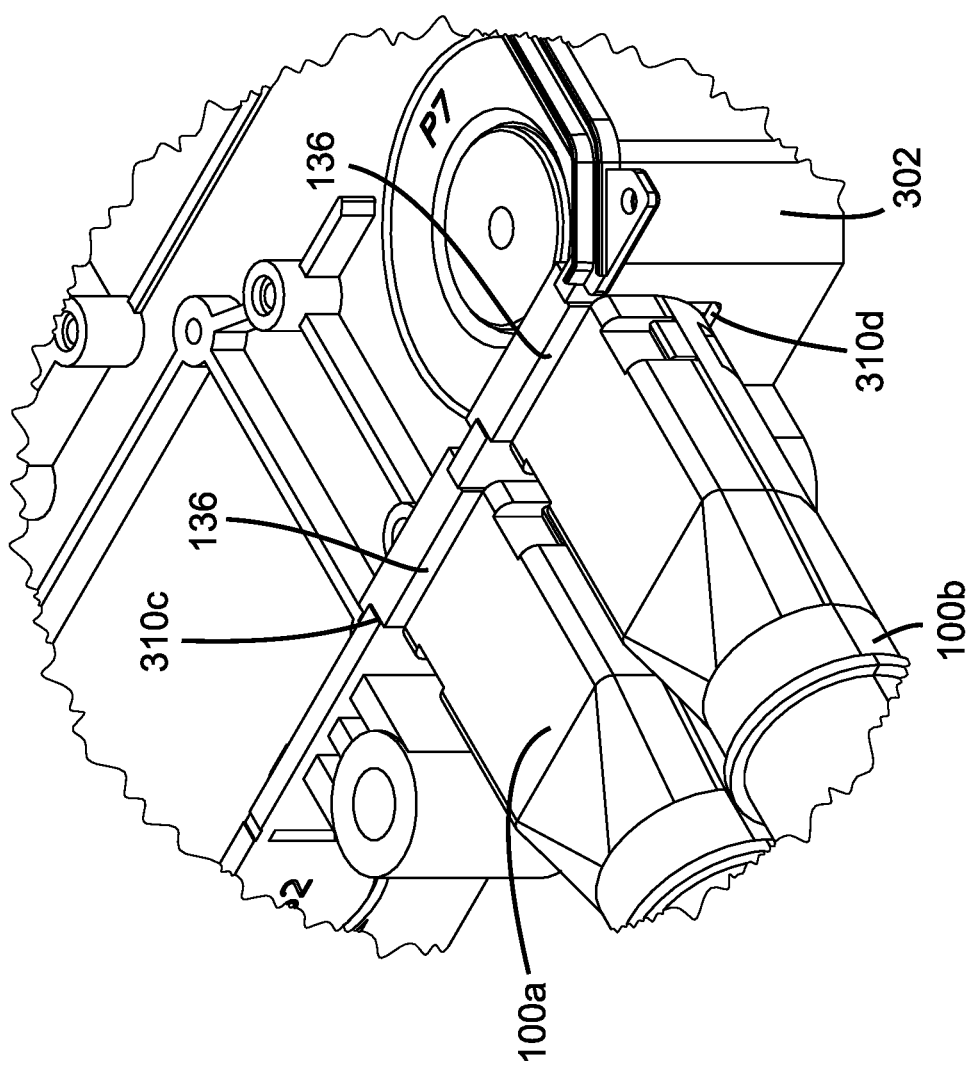
FIG. 17 is a detailed view of FIG. 16 showing an interface between the devices and the second type of enclosure.

FIGS. 15 and 16 are top perspective views of devices 100*a*, 100*b* mounted in the second type of enclosure 300. FIG. 17 is a detailed view of FIG. 16 showing an interface between the devices 100*a*, 100*b* and the enclosure 300. Referring now to FIGS. 15-17, the enclosure 300 includes a base 302 and a cover 304. The base 302 defines cable ports 310*a*-310*d* for cables such as multi-fiber distribution cables to enter and exit the enclosure 300. The second mounting location 104 of the devices 100*a*, 100*b* is mounted inside the cable ports 310*c*, 310*d*. In certain embodiments, the enclosure 300 is pressurized with an inert gas and the devices 100*a*, 100*b* seal the cable ports 310*c*, 310*d* to prevent the gas from escaping out of the pressurized enclosure.

In some examples, the cable ports 310*a*-310*d* can be initially blocked by temporary covers 306 that can be removed to open the cable ports 310*a*-310*d*. As an illustrative example, the temporary covers 306 can be punched out or cut out to open the cable ports 310*a*-310*d*.

Referring now to FIGS. 1-4 and 15-17, the groove 130 in the second mounting location 104 of the devices 100*a*, 100*b* can be slotted onto the base 302 where the cable ports 310*a*-310*d* are located such that the groove 130 is engaged between interior and exterior surfaces of the base 302 of the enclosure 300. As shown in FIGS. 16 and 17, the surface 136 of the second mounting location 104 is substantially flush with the exterior surface of the base 302.

Figure 18:
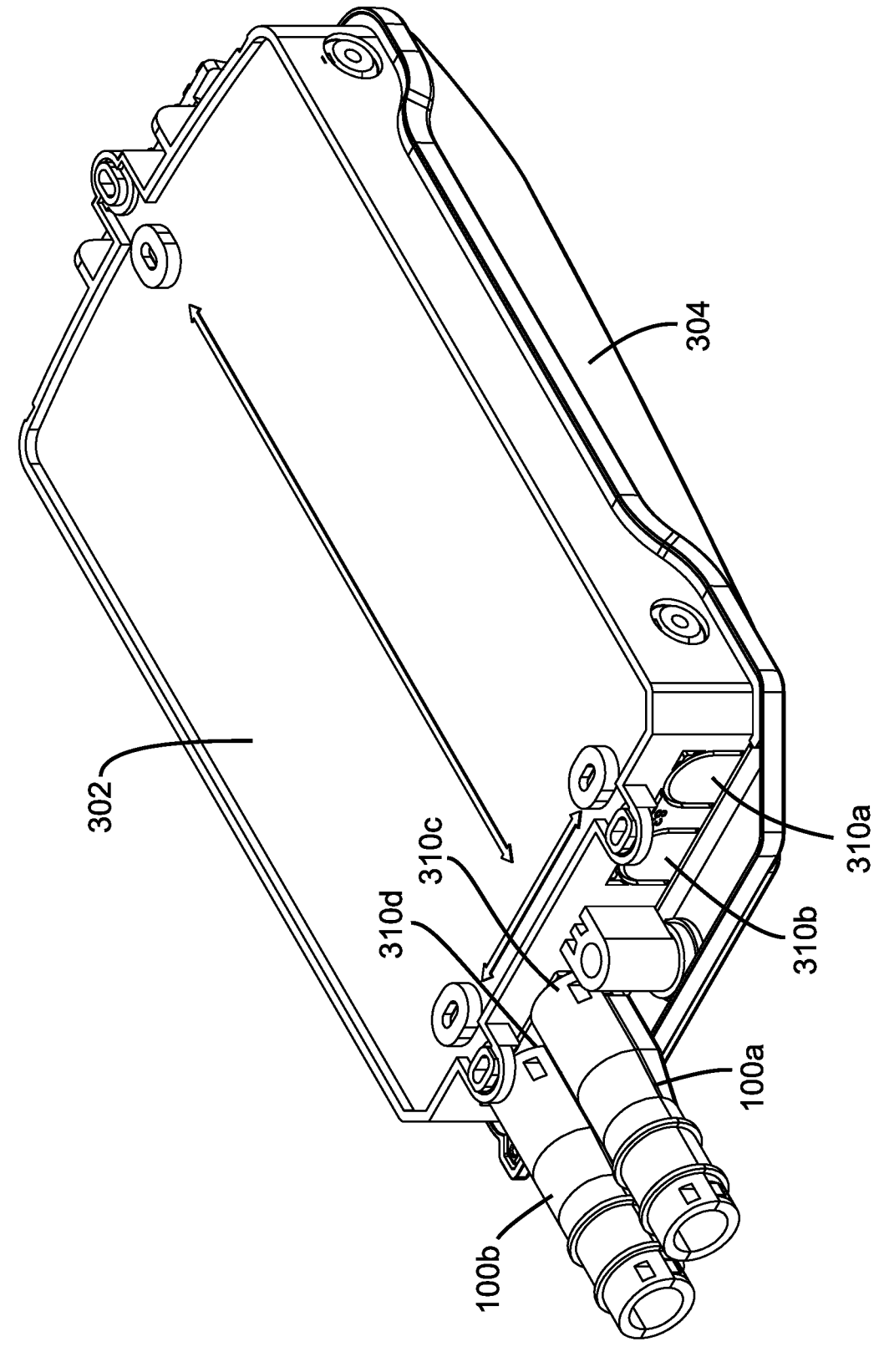
FIG. 18 is a bottom perspective view of the devices mounted in the cable ports of the second type of enclosure.
Figure 19:
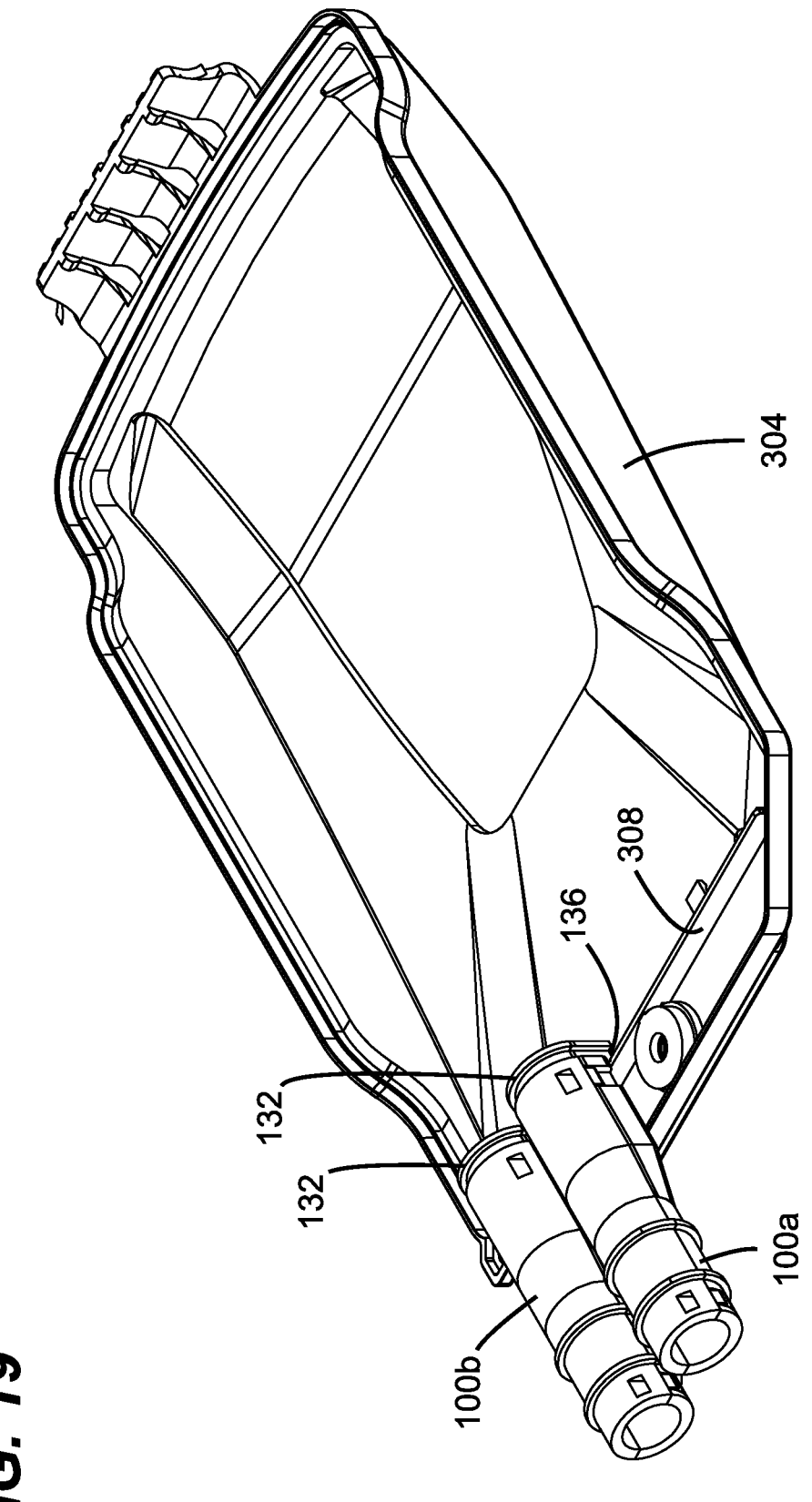
FIG. 19 is a bottom perspective view of the device mounted relative to the cover of the second type of enclosure.
Figure 20:
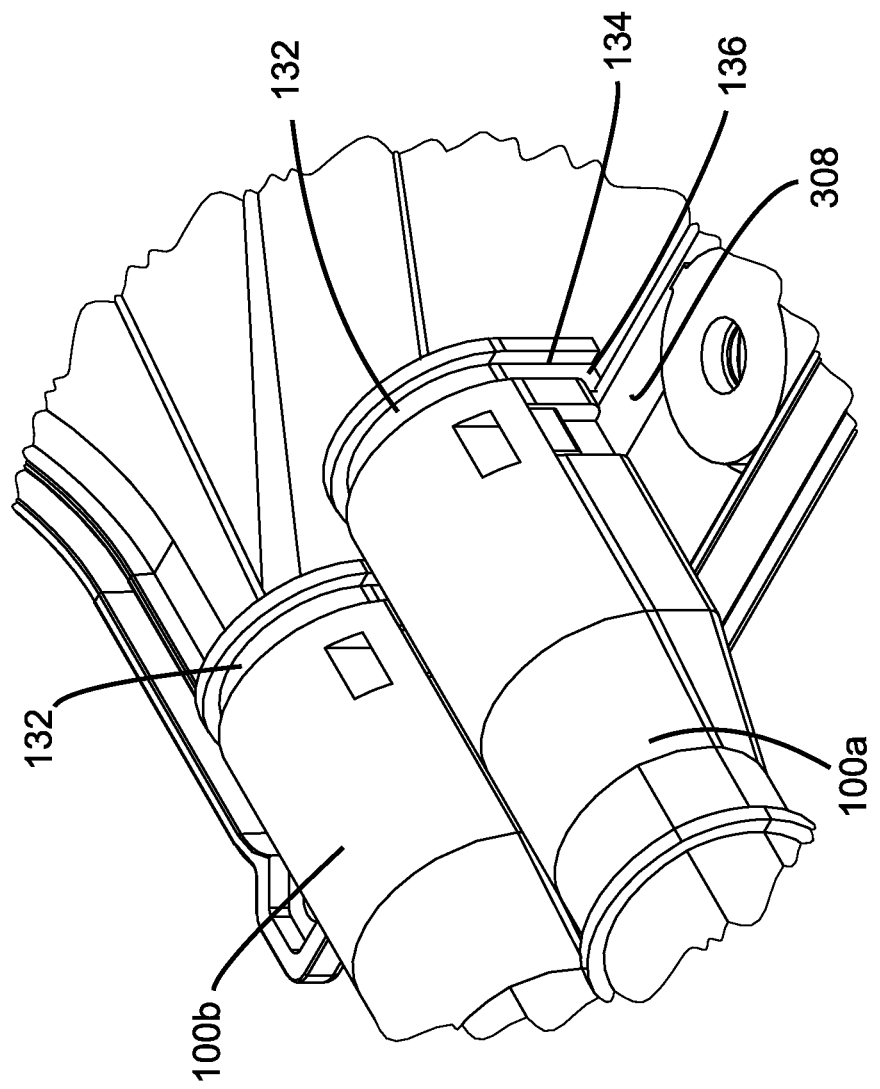
FIG. 20 is a detailed view of FIG. 19 showing an interface between the device and the cover of the second type of enclosure.

FIG. 18 is a bottom perspective view of the devices 100*a*, 100*b* mounted in the cable ports 310*c*, 310*d* of the enclosure 300. FIG. 19 is a bottom perspective view of the devices 100*a*, 100*b* mounted relative to the cover 304 of the enclosure 300. FIG. 20 is a detailed view of FIG. 19 showing an interface between the devices 100*a*, 100*b* and the cover 304 of the enclosure 300. Referring now to FIGS. 16-20, the cover 304 has a ridge surface 308 that extends across the width of the cover 304. When the cover 304 is attached to the base 302 of the enclosure 300, the ridge surface 308 interfaces with the surface 136 of the second mounting location 104 of the devices 100*a*, 100*b* such that the second mounting location 104 is captured between the base 302 and the cover 304 to secure the devices 100*a*, 100*b* in the cable ports 310*c*, 310*d*.

A rubber padding, resin, or other type of sealant can be inserted into the grooves 130 of the devices 100*a*, 100*b* to provide a gas-tight seal between the grooves 130 and the cable ports 310*c*, 310*d*. Similarly, a sealant such as a rubber pad or resin can also be mounted to the surface 136 to provide a gas-tight seal between the surface 136 and the ridge surface 308 of the cover.

Figure 21:
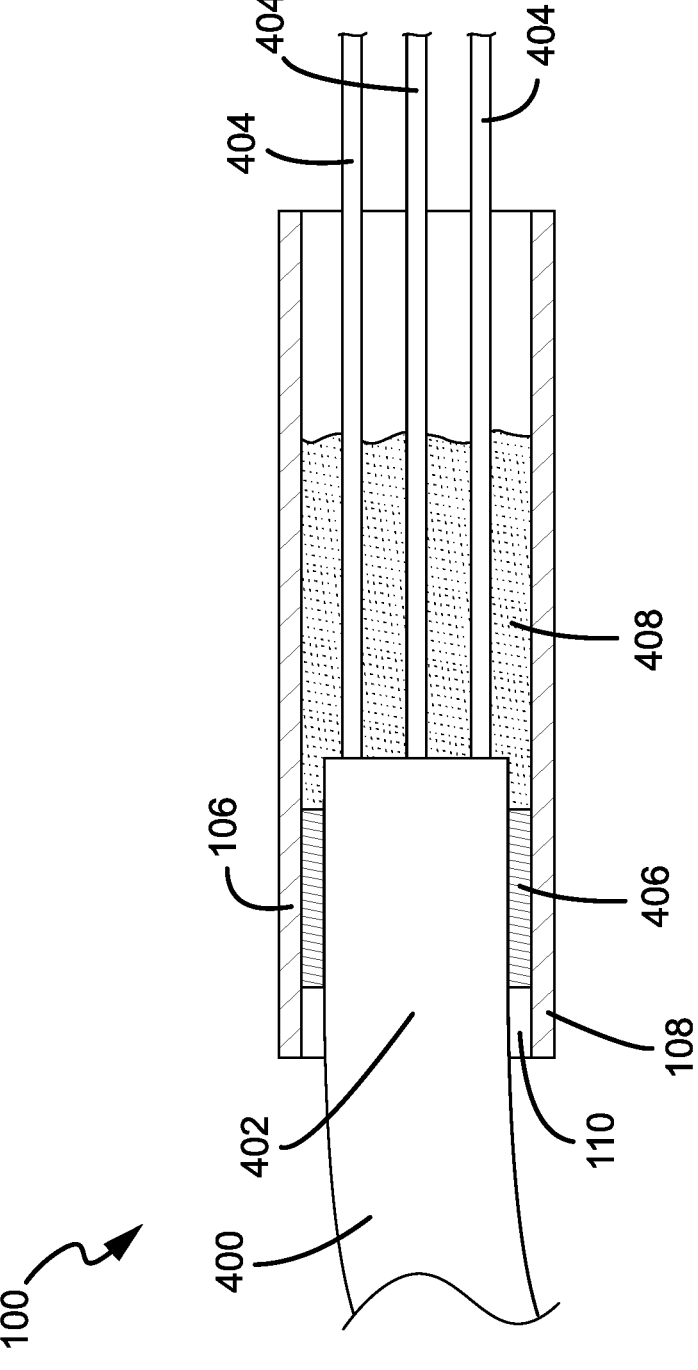
FIG. 21 illustrates a cross-sectional view of a telecommunications cable sealed inside a device in accordance with the embodiment of FIGS. 1-11.

FIG. 21 illustrates a cross-sectional view of a telecommunications cable 400 sealed inside the device 100. The telecommunications cable 400 can be a multi-fiber distribution cable that includes an outer protective jacket 402 that surrounds a bundle of tubes 404. Each tube 404 can contain one or more optical fibers. In some examples, an outer device 406 is positioned or wrapped around a portion of the outer protective jacket 402. In some examples, the outer device 406 is a foam tape that is wrapped around the outer protective jacket 402.

A portion of the outer protective jacket 402 is stripped to expose the tubes 404. The first and second parts 106, 108 are assembled around the portion of the telecommunications cable 400 where the outer protective jacket 402 is stripped.

In some further examples, the first and second parts 106, 108 are assembled around where the outer device 406 is positioned.

The outer device 406 (e.g., foam tape) can help to ensure that the telecommunications cable 400 is held snuggly inside the cavity 110 such that the cable does not slide relative to the device 100 after the first and second parts 106, 108 are assembled around the cable. The outer device 406 can also help to retain the poured resin in place until cured.

A resin 408 is applied into the cavity 110 to seal the telecommunications cable 400 inside the device 100. The resin 408 can seal around an exterior of the outer protective jacket 402. The resin 408 can also seal around an area where the outer protective jacket 402 is stripped, and around the tubes 404 that contain the optical fibers. The bundle of tubes 404 inside of the telecommunications cable 400 extend from an end of the outer protective jacket 402 past an end of the device 100.

In certain examples, the telecommunications cable 400 is pressurized with an inert gas, and the resin 408 inside the cavity 110 seals the inert gas inside the cable. In some embodiments, the resin 408 has a certain viscosity such that it does not overflow or run out before curing.

Figure 22:
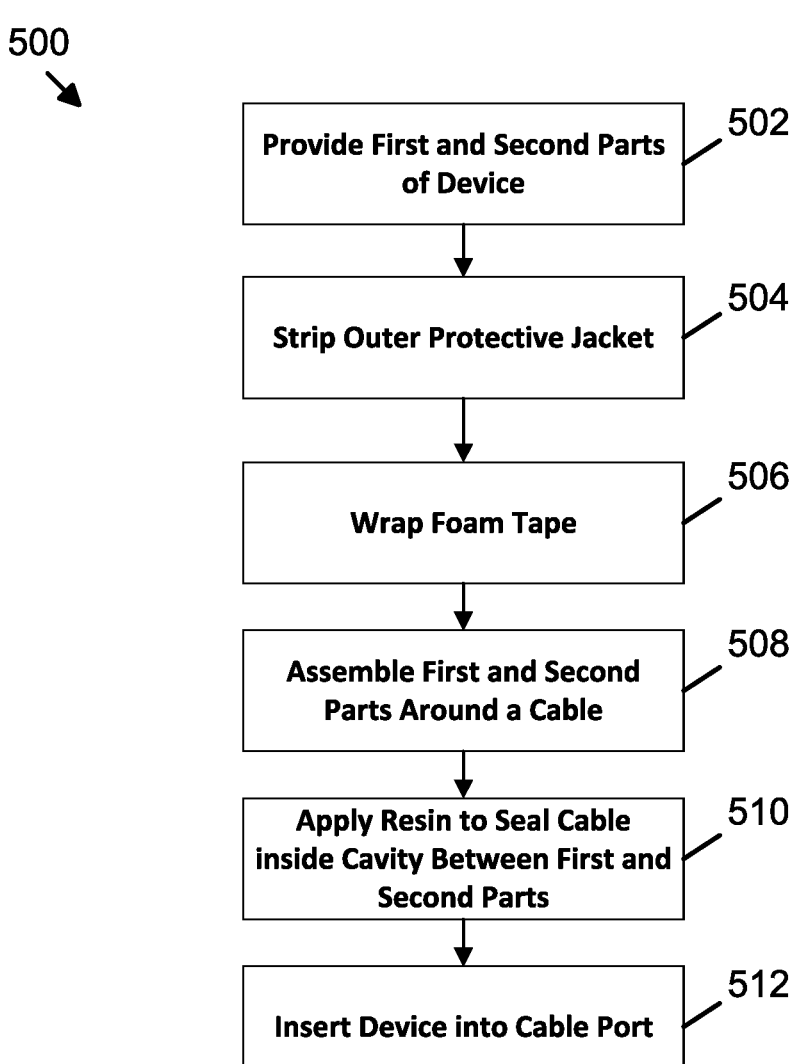
FIG. 22 schematically illustrates a method of sealing a telecommunications cable.

FIG. 22 schematically illustrates a method 500 of sealing a telecommunications cable such as the telecommunications cable 400. Referring now to FIGS. 21 and 22, the method 500 includes an operation 502 of providing the first and second parts 106, 108 of the device 100.

Next, the method 500 includes an operation 504 of stripping a portion of the outer protective jacket 402. In some examples, operation 504 is optional.

Next, the method 500 has an operation 506 of wrapping an outer device 406 such as foam tape around a remaining portion of the outer protective jacket 402 of the telecommunications cable 400. In some examples, operation 506 is optional.

In FIG. 22, operations 504, 506 are shown as being performed after completion of operation 502. Alternatively, the operations 504, 506 can be performed before operation 502. Also, in FIG. 22, operation 506 is shown as being performed after completion of operation 504. In some alternative examples, operation 506 can be performed before operation 504.

Next, the method 500 includes an operation 508 of assembling the first and second parts 106, 108 around the telecommunications cable 400 where the outer protective jacket 402 is stripped. In some examples, operation 508 can also include assembling the first and second parts 106, 108 around the portion where the outer device 406 is positioned. The attachment members 140, 142 can be used to snap-fit the first and second parts 106, 108 together to provide a simple and easy assembly around the telecommunications cable 400.

Next, the method 500 includes an operation 510 of applying the resin 408 to seal the telecommunications cable 400 inside the cavity 110. In some examples, operation 510 includes applying the resin 408 first to the interior surface 150 of the first part 106 and to the interior surface 152 of the second part 108 before the first and second parts 106, 108 are assembled around the telecommunications cable. In some examples, operation 510 includes filling the cavity 110 with the resin 408 after the first and second parts 106, 108 are assembled around the telecommunications cable 400. Additional examples are contemplated.

In certain embodiments, the telecommunications cable 400 is pressurized with an inert gas and the resin 408 seals the cable to prevent the inert gas from escaping out of the cable at the location where the outer protective jacket 402 is stripped.

Next, the method 500 includes an operation 512 of inserting the device 100 into a cable port of a telecommunications enclosure.

In one embodiment, operation 512 includes inserting the device 100 into a cable port of the enclosure 200 by mounting a first cable seal 208*a* in a cable seal opening 206, mounting the first mounting location 102 of the device 100 onto a cable port 210*a* partially defined by the first cable seal 208*a*, and mounting a second cable seal 208*b* over the first cable seal 208*a* and the first mounting location 102 of the device 100*a* to capture the device 100*a* inside the cable port 210*a* between the first and second cable seals 208*a*, 208*b*.

In some further embodiments, the first mounting location 102 of a second device, such as the device 100*b* of FIGS. 12-14, is mounted onto a cable port 210*b* partially defined by the second cable seal 208*b*, and a third cable seal 208*c* is then mounted over the second cable seal 208*b* and the first mounting location 102 of the device 100*b* to capture the device 100*b* inside the cable port 210*b* defined between the second and third cable seals 208*b*, 208*c*.

In some further embodiments, the enclosure 200 is pressurized with an inert gas after the device 100*b* is mounted onto the cable port 210*b*, and the cover 204 is attached to the base 202 of the enclosure 200. In such examples, the devices 100*a*, 100*b* seal the cables ports 210*a*, 210*b*, and prevent the inert gas from escaping out of the enclosure 200.

In another embodiment, operation 512 includes inserting the device 100 into a cable port of the enclosure 300 by removing a temporary cover 306 to open a cable port 310, slotting the groove 130 in the second mounting location 104 of the device 100 onto the cable port 310 such that the groove 130 is engaged between interior and exterior surfaces of the base 302 of the enclosure 300, and then attaching the cover 304 to the base 302 such that the surface 136 of the second mounting location 104 interfaces with the cover 304 to capture the second mounting location 104 between the base 302 and the cover 304 of the enclosure 300.

In certain embodiments, the enclosure 300 is pressurized with an inert gas. The device 100 seals the cable port 310 to prevent the inert gas from escaping out of the enclosure 300.

The various embodiments described above are provided by way of illustration only and should not be construed to limit the claims attached hereto. Those skilled in the art will readily recognize various modifications and changes that may be made without following the example embodiments and application illustrated and described herein, and without departing from the true spirit and scope of the following claims.

What is claimed is:

1. A device for sealing a telecommunications cable, the device comprising:

a first part;

a second part having one or more attachment members that assemble onto the first part to assemble the first and second parts together; and a cavity defined between the first and second parts that extends along a central axis and between first and second ends of the device;

wherein the cavity is structured to seal the cable between the first and second parts without threading the cable through the first and second ends by wrapping the device around the cable, and the first and second parts define a first mounting location structured to seal a cable port in a first type of enclosure and a second mounting location structured to seal a cable port in a second type of enclosure, the first mounting location having a rounded exterior surface that extends around the central axis between first and second projections that extend radially from the central axis, and the second mounting location including a groove that extends at least partially around the central axis, wherein a first portion of the groove is semi-circular, and a second portion of the groove is linear, and wherein the first portion of the groove is defined by the second part, and the second portion of the groove is defined by the first part.

2. The device of claim 1, wherein the cavity is structured to receive a resin to seal the cable between the first and second parts.

3. The device of claim 1, wherein the attachment members are snap-fit connectors.

4. The device of claim 1, wherein one of the first and second parts has at least one alignment rib extending parallel to the central axis, and the other of the first and second parts has at least one alignment groove extending parallel to the central axis, the alignment groove structured to receive the alignment rib to align the first and second parts along the central axis.

5. The device of claim 1, wherein the rounded exterior surface is partially defined by the first part and is partially defined by the second part.

6. The device of claim 1, wherein the rounded exterior surface is cylindrical.

7. The device of claim 1, wherein the first and second projections are partially defined by the first part and are partially defined by the second part.

8. The device of claim 7, wherein the first and second projections are circular rims that extend around the central axis.

9. The device of claim 1, wherein the first projection is structured to engage an exterior surface of a cable seal mounted in the first type of enclosure, and the second projection is structured to engage an interior surface of the cable seal mounted in the first type of enclosure to secure the rounded exterior surface of the first mounting location between the exterior and interior surfaces of the cable seal mounted in the first type of enclosure.

10. The device of claim 1, wherein the groove is structured to be engaged between interior and exterior surfaces of a base of the second type of enclosure.

11. The device of claim 1, wherein the second mounting location further includes a surface that is orthogonal to the central axis, and that is structured to interface with a cover of the second type of enclosure.

12. The device of claim 11, wherein the second mounting location is configured to secure the device to a port defined between the base and the cover of the second type of enclosure.

13. The device of claim 1, wherein the first and second projections are positioned toward the first end of the device, and wherein the groove of the second mounting location is positioned toward the second end of the device.

14. A device for sealing a telecommunications cable, the device comprising:

a first part;

a second part having one or more attachment members that assemble onto the first part to assemble the first and second parts together; and a cavity defined between the first and second parts that extends along a central axis and between first and second ends of the device;

wherein the cavity is structured to seal the cable between the first and second parts without threading the cable through the first and second ends by wrapping the device around the cable, and the first and second parts define a first mounting location structured to seal a cable port in a first type of enclosure and a second mounting location structured to seal a cable port in a second type of enclosure, the first mounting location having a rounded exterior surface that extends around the central axis between first and second projections that extend radially from the central axis, and the second mounting location including a groove that extends at least partially around the central axis, wherein a first portion of the groove is semi-circular, and a second portion of the groove is linear, and wherein the first portion of the groove is defined by the second part, and the second portion of the groove is defined by the first part;

wherein the cavity is structured to receive a resin to seal the cable between the first and second parts;

wherein the attachment members are snap-fit connectors;

wherein the first and second parts surround a portion of the cable where an outer protective jacket is stripped;

wherein a bundle of tubes inside of the cable extend from an end of the jacket past an end of the device;

wherein the resin is only located in the cavity.

* * * * *